US011543320B2

(12) United States Patent
King et al.

(10) Patent No.: US 11,543,320 B2
(45) Date of Patent: Jan. 3, 2023

(54) WIRELESS TORQUE WRENCH WITH TORQUE SPECIFICATIONS

(71) Applicant: Snap-on Incorporated, Kenosha, WI (US)

(72) Inventors: Jerry A. King, Hacienda Heights, CA (US); Nathan J. Lee, Escondido, CA (US); Christopher Lawton, Costa Mesa, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/007,546

(22) Filed: Aug. 31, 2020

(65) Prior Publication Data
US 2020/0400525 A1 Dec. 24, 2020

Related U.S. Application Data

(63) Continuation-in-part of application No. 15/601,361, filed on May 22, 2017, now Pat. No. 10,792,795.

(51) Int. Cl.
*G01L 25/00* (2006.01)
*G01L 3/00* (2006.01)
*B25B 23/142* (2006.01)

(52) U.S. Cl.
CPC ........ *G01L 25/003* (2013.01); *B25B 23/1425* (2013.01); *G01L 3/00* (2013.01)

(58) Field of Classification Search
CPC ... B25B 23/1425; B25B 23/14; B25B 13/463; B25G 1/102; G01L 25/003; G01L 3/00; G05B 2219/2616; G05B 2219/2604; G05B 2219/23146; G05B 2219/31304; B23Q 17/2457

USPC ........................................................ 702/108
See application file for complete search history.

(56) References Cited

U.S. PATENT DOCUMENTS

| 5,890,406 A | 4/1999 | Thorn |
| 6,405,598 B1 | 6/2002 | Bareggi |
| 7,089,834 B2 | 8/2006 | Reynerstson |
| RE41,160 E | 3/2010 | Gilmore |
| 7,841,100 B2 | 11/2010 | Lucke |
| 7,878,076 B2 | 2/2011 | Lucke |

(Continued)

FOREIGN PATENT DOCUMENTS

| CN | 105234897 | 1/2017 |
| CN | 106441689 | 2/2017 |

(Continued)

OTHER PUBLICATIONS

Australian Examination Report No. 1 for Application No. 2019240696 dated Aug. 19, 2020, 6 pages.

(Continued)

*Primary Examiner* — Michael W Choi
(74) *Attorney, Agent, or Firm* — Seyfarth Shaw LLP

(57) ABSTRACT

An interactive software application on a mobile computing device is used to configure an electronic torque wrench via a wireless connection. The software application obtains torque specifications for a vehicle from a remote database. When the torque specification require that work pieces be torqued in an ordered sequence, the software application guides the technician through the sequence, but accommodates changes when the technician departs from the sequence.

6 Claims, 20 Drawing Sheets

(56) References Cited

U.S. PATENT DOCUMENTS

| | | |
|---|---|---|
| 7,942,084 B2 | 5/2011 | Wilson, Jr. |
| 8,050,788 B2 | 11/2011 | Stencel |
| 8,171,828 B2 | 5/2012 | Duvan |
| 8,413,525 B1 | 4/2013 | Schultz et al. |
| 8,438,957 B2 | 5/2013 | Wener |
| 8,443,703 B2 | 5/2013 | Chen |
| 8,869,630 B2 | 10/2014 | Watson |
| 9,156,148 B2 | 10/2015 | King |
| 9,157,818 B2 | 10/2015 | Schultz |
| 9,256,220 B1 | 2/2016 | Coffland |
| 9,272,397 B2 | 3/2016 | Goetz |
| 9,395,257 B2 | 7/2016 | Li |
| 9,430,370 B2 | 8/2016 | Mergener |
| 9,466,198 B2 | 10/2016 | Burch |
| 9,756,402 B2 | 9/2017 | Stampfl et al. |
| 9,888,300 B2 | 2/2018 | Stampfl et al. |
| 10,136,198 B2 | 11/2018 | Stampfl et al. |
| 10,149,142 B2 | 12/2018 | Coulis et al. |
| 2006/0225519 A1* | 10/2006 | Nakagawa .......... B25B 23/1425 73/862.22 |
| 2007/0272423 A1 | 11/2007 | Cutler |
| 2008/0115636 A1 | 5/2008 | DeRose et al. |
| 2009/0241743 A1 | 10/2009 | Hsieh |
| 2010/0096151 A1 | 4/2010 | Ostling |
| 2011/0093110 A1 | 4/2011 | Stencel et al. |
| 2012/0234569 A1 | 9/2012 | Lawton |
| 2013/0047408 A1 | 2/2013 | Kibblewhite |
| 2014/0238714 A1* | 8/2014 | Lawton ............... B25B 23/1425 173/1 |
| 2014/0331831 A1 | 11/2014 | King et al. |
| 2015/0086081 A1 | 3/2015 | Conradt |
| 2015/0210112 A1 | 7/2015 | Lawton |
| 2016/0067859 A1 | 3/2016 | Rejman |
| 2016/0129569 A1 | 5/2016 | Lehnert |
| 2016/0256989 A1 | 9/2016 | Gauthier |
| 2018/0012047 A1 | 1/2018 | Chu |
| 2018/0333831 A1 | 11/2018 | Lee et al. |
| 2018/0367874 A1 | 12/2018 | Stempfl et al. |
| 2019/0314964 A1 | 10/2019 | King et al. |
| 2020/0400525 A1 | 12/2020 | King et al. |

FOREIGN PATENT DOCUMENTS

| | | |
|---|---|---|
| CN | 205968804 | 2/2017 |
| CN | 108942767 A | 12/2018 |
| CN | 110370212 A | 10/2019 |
| TW | 200829384 | 7/2008 |
| TW | 201233504 | 8/2012 |
| TW | 201511898 | 4/2015 |
| TW | 201604800 | 2/2016 |
| TW | I569923 | 2/2017 |
| TW | 201910068 A | 3/2019 |
| WO | 200204174 | 1/2002 |
| WO | 2004028749 | 4/2004 |
| WO | 2011139350 | 11/2011 |
| WO | 2013085675 | 6/2013 |
| WO | 2013188334 | 12/2013 |
| WO | 2014201243 | 12/2014 |
| WO | 2017025809 | 2/2017 |
| WO | 2017060777 | 4/2017 |

OTHER PUBLICATIONS

Australian Examination Report No. 1 for Application No. 2018201434 dated Oct. 5, 2018, 6 pages.

United Kingdom Combined Search and Examination Report for Application No. GB1804448.7 dated Sep. 18, 2018, 7 pages.

Taiwan First Office Action for Application No. 107117406, dated Nov. 29, 2018, 7 pages.

Canadian Office Action for Application No. 2,998,002, dated Feb. 13, 2019, 2018, 3 pages.

UK Examination Report for Application No. GB1804448.7, dated Jul. 19, 2019, 4 pages.

Chinese Office Action for Application No. 201810498686X, dated Oct. 22, 2019, 8 pages.

Canadian Office Action for Application No. 2,998,002, dated Nov. 25, 2019, 3 pages.

Combined Search and Examination Report for Application No. GB1918271.6 dated May 12, 2020, 6 pages.

Australian Examination Report for Application No. 2019240696 dated Nov. 4, 2020, 4 pages.

Chinese Office Action for Application No. 201810498686.X dated Jan. 6, 2021, 3 pages.

Combined Search and Examination Report for corresponding Application No. GB2112130.6 dated May 20, 2022, 11 pages.

Chinese Office Action for corresponding Application No. 202111013208.3 dated Sep. 15, 2022, 6 pages.

\* cited by examiner

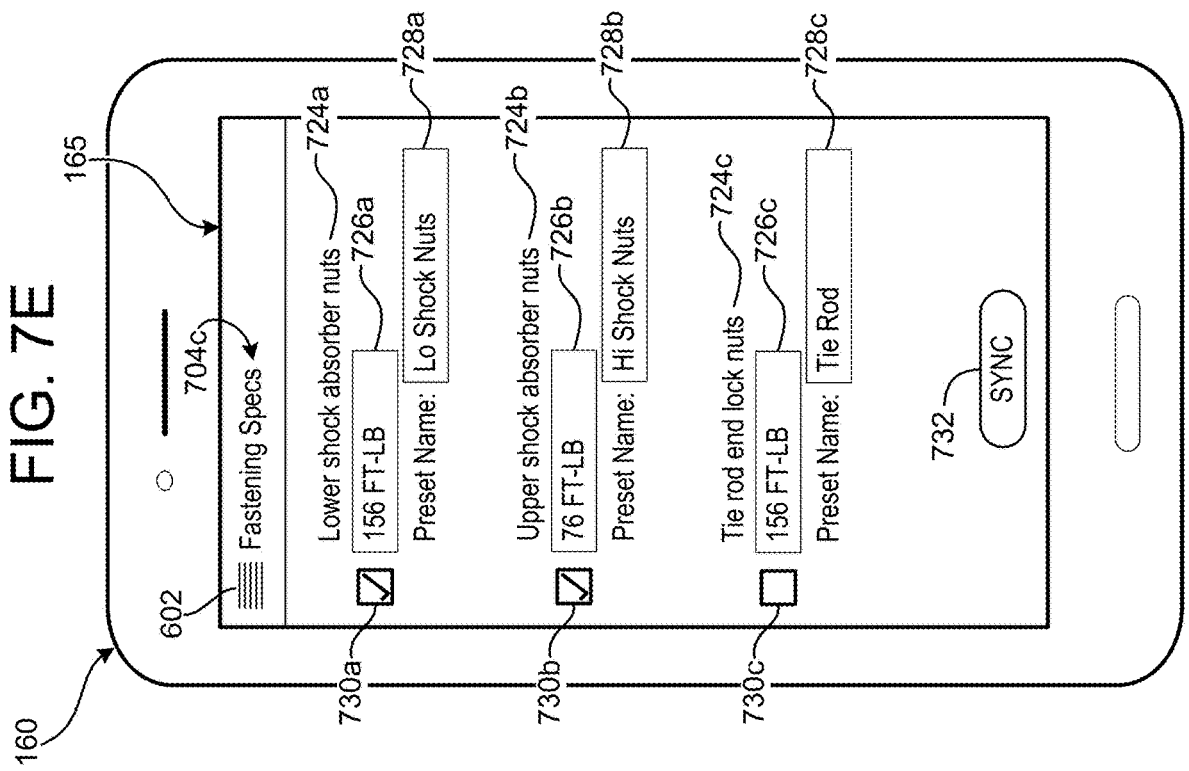

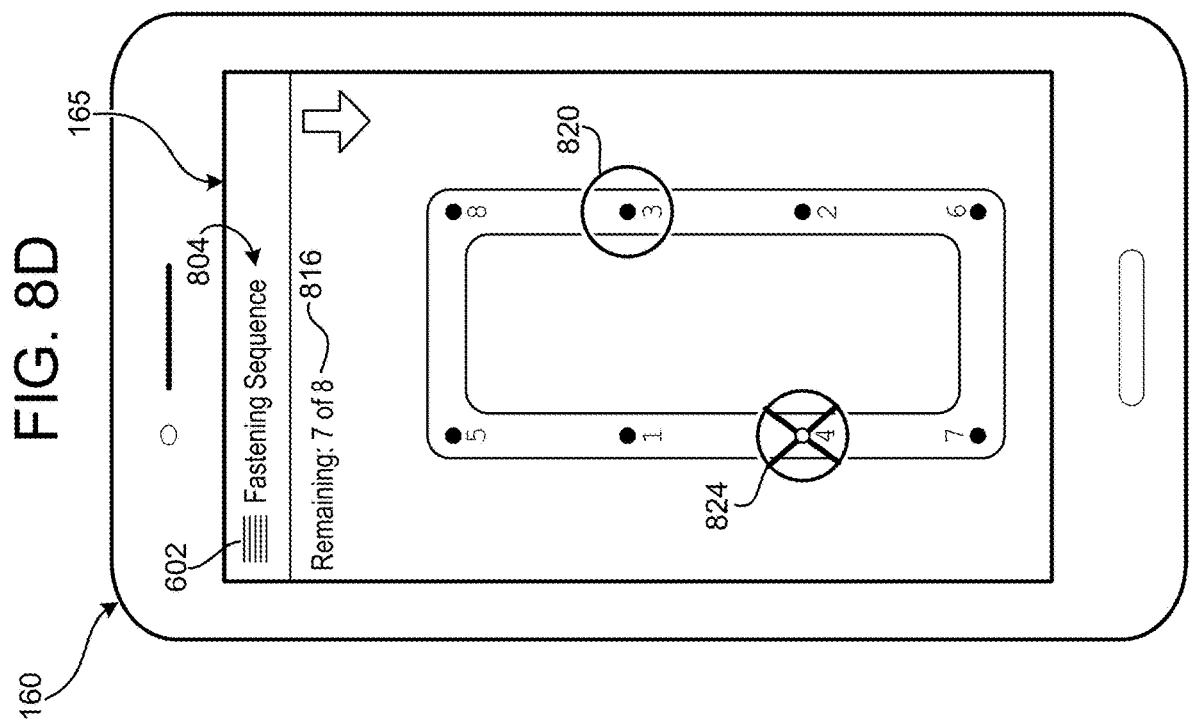
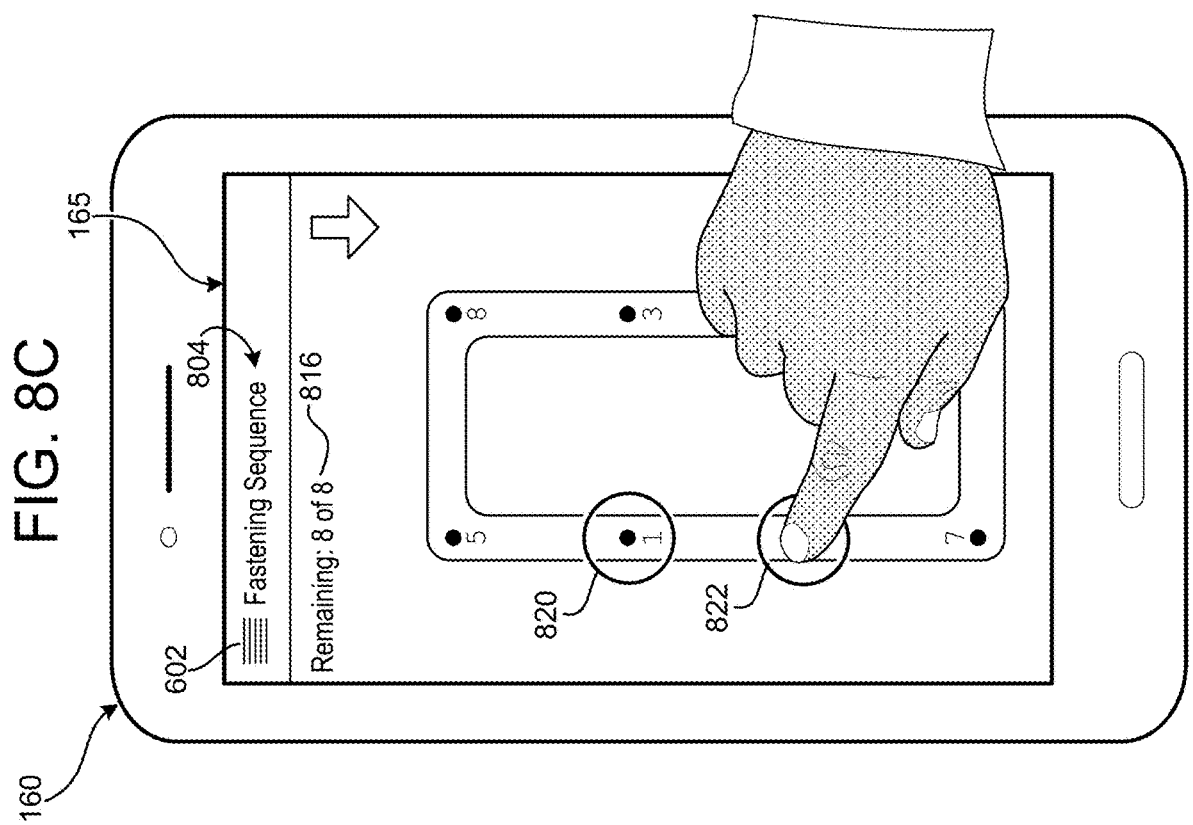

WIRELESS TORQUE WRENCH WITH TORQUE SPECIFICATIONS

CROSS-REFERENCES TO RELATED APPLICATIONS

This application is a continuation-in-part of, and claims the priority benefit of, U.S. patent application Ser. No. 15/601,361, filed May 22, 2017, the contents of which are incorporated herein by reference in their entirety.

TECHNICAL FIELD OF THE INVENTION

A torque wrench with a wireless link to a software application on a mobile device. The software application is used to lookup specifications and configure the wrench, and provides real-time interactive functionality.

BACKGROUND OF THE INVENTION

Electronic torque wrenches are gaining popularity in automotive, fleet, aviation, and other assembly and repair applications. Such wrenches are used to apply torque to a rotatable "work piece," such as a screw, a nut, a bolt, or other rotatable fastener, and to measure the torque applied to the work piece by the wrench. These wrenches can indicate to a technician (i.e., a wrench user) when the work piece has been torqued to the appropriate torque value, such as 100 ft-lb. Some electronic torque wrenches also measure angles as a work piece is rotated. Angle measurement may be used to determine which work pieces have already been tightened, and/or to tighten a work piece beyond a snug point or threshold torque by a certain angle.

Some tasks require a specific fastening procedure, such as applying specific amounts of torque to a series of work pieces in an ordered sequence. Fastening procedures may also require applying specific angle adjustments to the work pieces in the sequence to ensure proper tightening. The procedure for an individual work piece in the sequence may also require applying torques and/or angles to the individual work piece in stages. For example, an aerospace fuel line nut requires a specific rundown angle, seating torque, and final torque and angle to determine if the joint seats correctly.

Technicians may try to find the correct torque specifications and sequence in literature, in original equipment manufacturer (OEM) data, online, or via a consolidated information service, such as the "Mitchell 1" service for automotive industry repair information. However, the time lost to researching specifications lengthens the time required to conduct a torqueing operation. Due to the time required to lookup the correct fastening values and procedures, technicians often instead rely on inaccurate personal experience or resort to trial and error. Further, if a technician programs a wrench with a preset called "Preset 1," then unless the preset is used on a regular basis, its purpose may be quickly forgotten (and be a complete mystery if the wrench is shared with another technician).

SUMMARY OF THE INVENTION

A system broadly comprising an electronic torque wrench and a software application. The software application is executable by a computing device, such as a cellular telephone or tablet computer, and connects to the electronic torque wrench by way of a wireless communications link. Using the software application, a technician can configure the torque wrench, and use the software application to obtain torque specifications from a remote service. If the torque specifications include an ordered sequence, the software application can direct the technician through the sequence, configuring the torque wrench accordingly. Should the technician depart from the sequence, the software application accommodates the change, providing a recommendation to the technician on how to proceed in view of the alteration of the sequence. The process performed by the software application may take the form of a method, computer-executable code stored on a computer readable medium, or a computing device configured to perform the process.

Implemented as a method, the method broadly comprises querying a database to determine at least one fastening task associated with a torqueing operation. After receiving the results, they are displayed for a technician to review, so that the technician may select a fastening task for which the electronic wrench will be configured. After receiving a selection of a fastening task from among those displayed, torque specifications are determined for the selected fastening task. When the torque specifications include an ordered sequence of work pieces, an indication is provided for the technician as to which work piece to torque as a recommendation. However, the technician can select a different work piece than the one indicated. When a work piece is selected that does not comport with the ordered sequence, the electronic torque wrench is configured for the torque specification corresponding to the selected work piece, and a determination is made as to which work piece should be torqued next in view of the selected work piece departing from the ordered sequence. Based on the determination, an indication is provided for the technician as to which work piece is recommended as the next to torque. This process of recommending which work piece should be torqued, receiving a selection, and configuring the wrench, continues until all work pieces in the sequence have been torqued.

Implemented as a computing device, the device broadly comprises a processor, a display, and a memory storing instructions to be executed by the processor. The instructions configure the processor to query a database to determine at least one fastening task associated with a vehicle. The fastening tasks are output to the display. A selection of a fastening task is received from among the fastening tasks output to the display. The processor determines torque specifications for the selected fastening task. When the torque specifications include an ordered sequence of work pieces, the processor indicates, via the display, a work piece to be torqued in accordance with the ordered sequence. After a work piece is selected that does not comport with the ordered sequence (i.e., selected out-of-order), the processor configures an electronic torque wrench for the torque specification corresponding to the selected work piece, and determine a next work piece to be torqued after the selected work piece. The processor indicates, via the display, the next work piece to be torqued. This process of recommending which work piece should be torqued, receiving a selection, and configuring the wrench, continues until all of the work pieces in the sequence have been torqued.

BRIEF DESCRIPTION OF DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIGS. 7A to 7E illustrate examples of user interfaces provided by the software application in conjunction with the process flow in FIG. 6 that configure the wrench with fastening specifications.

FIGS. 8A to 8D illustrate examples of an interactive user interface provided by the software application to guide a technician through an ordered fastening sequence in conjunction with the process flow in FIG. 6.

DETAILED DESCRIPTION OF THE EMBODIMENTS

Figure 1:
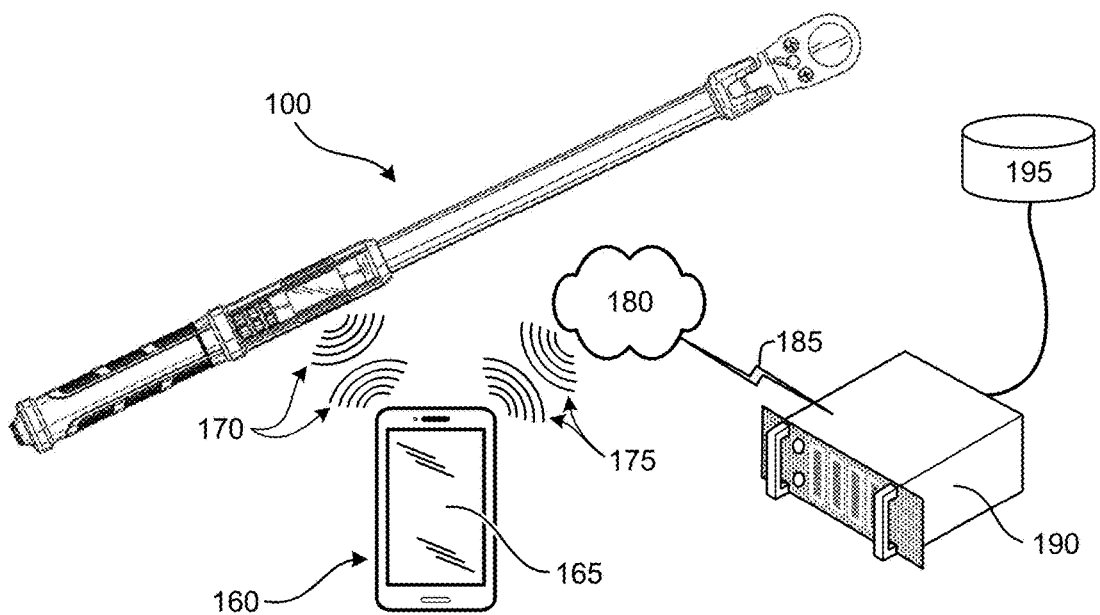
FIG. 1 illustrates an example of a system including an electronic torque wrench and a mobile computing device.

While the present invention is susceptible of embodiments in many different forms, there is shown in the drawings, and will herein be described in detail, embodiments, including a preferred embodiment, of the invention with the understanding that the present disclosure is to be considered as an exemplification of the principles of the invention and is not intended to limit the broad aspect of the invention to any one or more of the embodiments illustrated or disclosed. As used herein, the term "present invention" is not intended to limit the scope of the claimed invention, and is instead a term used to discuss exemplary embodiments of the invention for explanatory purposes only.

Many technicians use mobile computing devices, such as tablet computers or "smart" phones with them. Among other things, technicians may use these devices to look up fastening values and procedures. The user interfaces of the applications on these devices tend to use standardized graphical user interfaces (GUIs), such that operating new applications is often intuitive and requires little-to-no training. The near-ubiquity of these devices and users' existing familiarity with the interface can be leveraged to simplify and expand access to the full suite of features offered by an electronic torque wrench, and to add new features and services.

Such an approach avoids the substantial costs and complexity associated with tethered base station solutions, which primarily are designed for the industrial market. Tool sharing is also simplified, since the presets and wrench settings can be seamlessly reconfigured for the preferences of the technician currently using the wrench based on which technician is associated with and/or logged into the mobile computing device, while preserving the presets and preferences of other technicians. Since presets and preferences can be transferred from the device to the tool at the start of a session, the electronic wrench can provide a full suite of services with a smaller amount of on-tool memory than an equivalent standalone wrench.

Referring to FIG. 1, an example of a system including an electronic torque wrench 100 and a mobile computing device 160. The wrench 100 communicates with the device 160 via a wireless communications link 170 using a protocol such as Bluetooth, Bluetooth Smart (also known as Bluetooth low energy), Wi-Fi Direct, or any other wireless protocol. In an embodiment, the device 160 includes a touch-sensitive display 165 via which a technician interacts with user interfaces provided by a software application on the device 160. Among other things, the software application may be used to configure the wrench, to look-up fastening values and procedures, and to review wrench logs. The software application also provides the technician with live, real-time feedback and interactive functionality to assist the technician with progressing through fastening procedures.

The device 160 provides access to a torque values and procedures database 195 via a wireless communications link 175 to a data communications network 180, such as the Internet. The wireless communications link 175 may be, for example, a Wi-Fi link between the device 160 and a local wireless router, or a cellular data link between the device 160 and a nearby cell tower, using a cellular protocol such as Long Term Evolution (LTE), Global System for Mobile Communications (GSM), Code Division Multiple Access (CDMA), etc.

One-or-more servers 190 are connected to the network 180 via communications link(s) 185. Based on queries received from the software application on the device 160, a server 190 retrieves fastening value and procedures data from the database 195, transmits query results to the device 160 via the network 180. Among other system arrangements, the server(s) 190 and database(s) 195 may be associated with a software service provider, a manufacturing company, or with the company providing repair services. In one example, the database 195 may be the "Mitchell 1" database/service for automotive industry repair information.

Figure 2A:
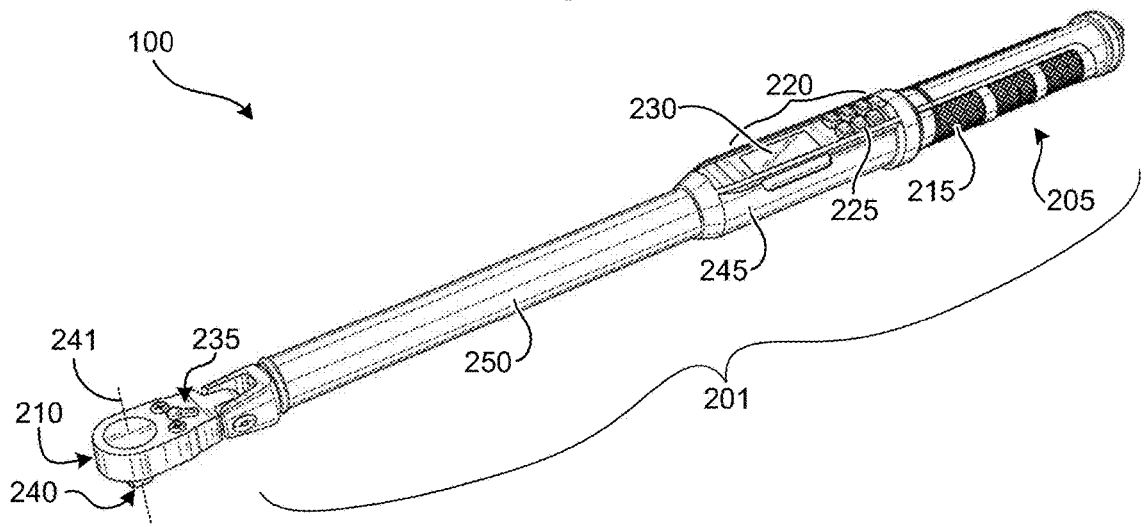
FIGS. 2A and 2B illustrate different views of the electronic torque wrench of FIG. 1.
Figure 2B:
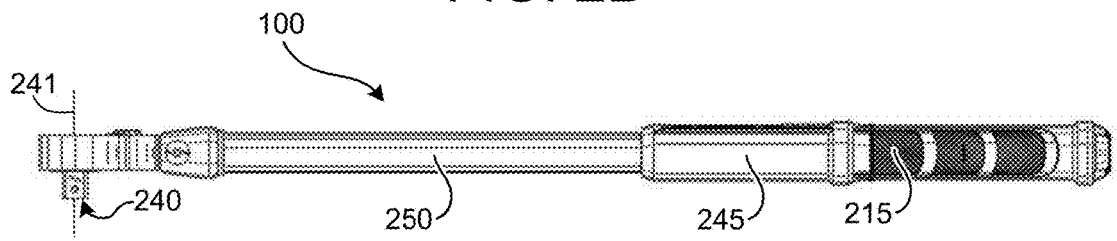

FIGS. 2A and 2B illustrate different views of an example of the electronic torque wrench 100. The wrench 100 is adapted to apply torque to a work piece via an adapter or socket coupled to a drive 240, such as a bi-directional ratcheting square or hexagonal drive. Conventionally, the drive 240 is a "male" connector designed to fit into or penetrate a female counterpart (as illustrated), but the drive may be a "female" connector designed to receive a male counterpart. The drive may also be structured to directly engage a work piece without coupling to an adapter or socket.

As will be described in further detail below, in an embodiment, the wrench 100 can measure, record, and display torque and angle data in real time during torqueing operations, as well as transmit that data in real time to the device

160. In the context of the system in FIG. 1, "real time" means "without significant delay" (e.g., measurement and processing delays not exceeding one second per data sample). Torque application and angle data may be logged and stored with a time index by the wrench 100 and/or the software application on the device 160.

The torque wrench 100 broadly comprises a shaft 201 connected to a head 210 housing the drive 240. When ratcheting and torqueing, the head 210 rotates around the center axis 241 of the drive 240, with the center axis 241 transecting the head 210. The shaft 201 comprises a handle 205, a control unit 245, and a neck 250. The neck 250 is coupled to the head 210 at the opposite end of the shaft 201 from the handle 205. As illustrated, the male drive 240 extends perpendicularly from the head 210, relative to the plane in which the head 240 rotates around the axis 241. Force is applied to the handle 205 to rotationally pivot the wrench 100 around the axis 241, thereby transferring torque to a workpiece (not illustrated) coupled to the drive 240.

The handle 205 may include a textured grip 215 to improve a technician's grasp of the wrench 100 during torqueing operations. The control unit 245 may include a user interface 220, such as a tactile user interface comprising at least one button 225 and a display screen 230. The display screen 230 may optionally be touch-sensitive, with the software or firmware executed by a processor or controller of the control unit 245 providing virtual on-screen controls.

Instructions and other information can be input directly into the wrench 100 via the user interface 220. During torqueing operations, the display 230 may display information, such as torque and/or angle information. The head 210 may include a reversing lever 235 for reversing the drive direction of a ratcheting mechanism. As will be discussed further below, the head 210 also houses one or more sensors used to sense the torque applied to a work piece via the drive 240, and the angle of rotation of the head 210 and shaft 201 around the axis 241. The head 210 may also include an orientation sensor to determine the angle of the axis 241 relative to "down" (that is, relative to the force of gravity).

Figure 3:
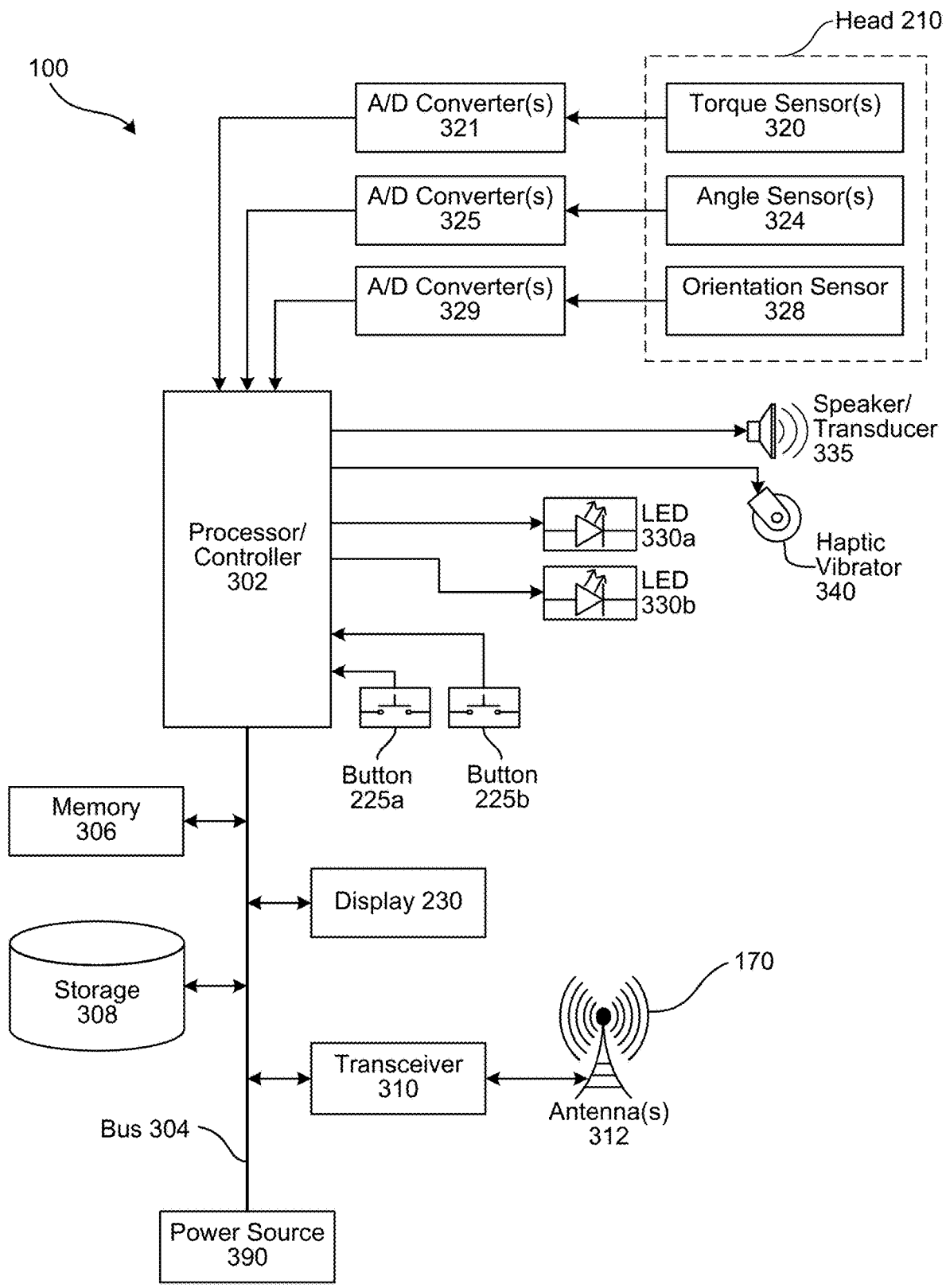
FIG. 3 is a block diagram conceptually illustrating example electronic components of the torque wrench of FIG. 1.

FIG. 3 is a block diagram conceptually illustrating examples of the electronic components of the electronic torque wrench 100 of FIG. 1. The wrench 100 may include one or more controllers/processors 302, a memory 306, non-volatile storage 308, and a wireless communications transceiver 310. Each controller/processor 302 may include a central processing unit (CPU) for processing data and computer-readable instructions. The processor/controller 302 retrieves instructions from data storage 308 via a bus 304, using the memory 306 for runtime temporary storage of instructions and data. The memory 306 may include volatile and/or nonvolatile random access memory (RAM). While components are illustrated in FIG. 3 as being connected via the bus 304, components may also be connected to other components in addition to (or instead of) being connected to other components via the bus 304.

Data storage 308 stores the instructions, including instructions to manage communications with the software application on the mobile computing device 160. The data storage component 308 may include one-or-more types non-volatile solid-state storage, such as flash memory, read-only memory (ROM), magnetoresistive RAM (MRAM), phase-change memory, etc. The wrench 100 may also include an input/output interface to connect to removable or external non-volatile memory and/or storage (such as a removable memory card, memory key drive, networked storage, etc.). Such an input/output interface may be a wired or embedded interface (not illustrated) and/or may comprise the wireless communications transceiver 310.

Computer instructions for operating the wrench 100 and its various components may be executed by the controller/processor 302, using the memory 306 as temporary "working" storage at runtime. The computer instructions may be stored in a non-transitory manner in non-volatile memory 306, storage 308, or an external device. Alternatively, some-or-all of the executable instructions may be embedded in hardware or firmware in addition to or instead of software.

The wrench 100 may include multiple input and output interfaces. These interfaces include the radio transceiver 310, one-or-more buttons 225a/225b, one-or-more light-emitting diodes LEDs) 330a/330b, a speaker or audio transducer 335, a haptics vibrator 340, one-or-more torque sensors 320, one-or-more angle sensors 324, and an orientation sensor 328. The torque sensor 320 may include, for example, one-or-more of a torque transducer, a strain gauge, a magnetoelastic torque sensor, and a surface acoustic wave (SAW) sensor. The angle sensors 324 may comprise, for example, one-or-more of a rotational angle sensor and an electronic gyroscope (such as a two-or-three axes gyroscope). The orientation sensor 328 may comprise a three-axes electronic accelerometer or gravity sensor to determine the orientation of the head 210 relative to "down."

Depending upon the type of torque sensor 320 used, analog-to-digital (A/D) converters 321 may receive analog signals from the torque sensor 320, outputting digital signals to the processor/controller 302. Likewise, A/D converters 325 may receive analog signals from the angle sensor 324, and A/D converters 329 may receive analog signals from the orientation sensor 328, outputting digital signals to the processor/controller 302. The A/D converters 321/325/329 may be discrete, integrated with/in the processor/controller 302, or integrated with/in their respective sensors 320/324/328.

The number of, and need for, the A/D converters 321/325/329 is dependent on the technology used for each sensor 320/324/328. Multiple A/D converters may be provided to accommodate as many signals as needed, such as if the angle sensor 324 provides analog outputs for a plurality of gyroscope axes, or if the orientation sensor 328 provides analog outputs for a plurality of accelerometer axes. Signal conditioning electronics (not illustrated) may also be included as standalone circuitry, integrated with/in the processor/controller 302, or integrated with/in the respective sensors 320/324/328, to convert non-linear outputs generated by a component of a sensor 320/324/328 into a linear signal.

Instructions executed by the processor/controller 302 receive data from the sensors 320/324/328, such as torque and angle values. From that data, the processor/controller 302 may determine various information, such as the duration that torque has been or should be applied to a work piece. For some job tasks where work pieces have distinctive orientations, the processor/controller 302 may determine which work piece is being torqued based on the orientation of the head 210.

The sensor data and information can be logged in real time or at a predetermined sampling rate and stored in a memory 306 and/or storage 308. The sensor data and information may also be transmitted to the device 160 via the communication link 170 for further analysis and review. The software application on the device 160 may, for example, graphically plot the sensor data and/or information. As other examples, the software application may determine an optimal torqueing profile to apply to future torqueing operations for that work piece or job task, or to determine that a correct torqueing profile was applied during the torqueing operation.

"Data" is/are values that are processed to make them meaningful or useful "information." However, as used herein, the terms data and information should be interpreted to be interchangeable, with data including information and information including data. For example, where data is stored, transmitted, received, or output, that may include data, information, or a combination thereof.

The radio transceiver 310 comprises a transmitter, a receiver, and associated encoders, modulators, demodulators, and decoders. The transceiver 310 manages the radio communication links, establishing the communications link 170 with the mobile device 160 via one-or-more antennas 312 embedded in the wrench, enabling bidirectional communication between the processor/controller 302 and the software application executed by the mobile device 160. The communications link 170 may be a direct link between the wrench 100 and the computing device 160 (as illustrated), or may be an indirect link through one-or-more intermediate components, such as via a Wi-Fi router or mesh connection (not illustrated).

The wrench 100 also includes a power source 390 to power the processor/controller 302, the bus 304, and other electronic components. For example, the power source 390 may be one-or-more batteries arranged in the handle 205. However, the power source 390 is not limited to batteries, and other technologies may be used such as fuel cells. The wrench 100 may also include components to recharge the power source 390, such as organic or polymer photovoltaic cells arranged along the neck 250, and/or an interface by which to receive an external charge, such as a Universal Serial Bus (USB) port or an inductive pick-up, along with associated charging-control electronics.

The display 230 may be used by software/firmware executed by the processor/controller 302 to display information for the technician to view and interpret. Such information may be formatted as text, graphics, or a combination thereof. The display 230 may also be used to provide feedback when information is entered into wrench 100 (for example, via the buttons 225 and/or a touch-sensitive interface integrated with the display 230 itself). The display 230 may be a liquid crystal display (LCD) display, an organic light emitting diode (OLED) display, an electronic paper display, or any kind of black-and-white or color display that has suitable power-consumption requirements and volume to facilitate integration into the control unit 245.

Figure 4:
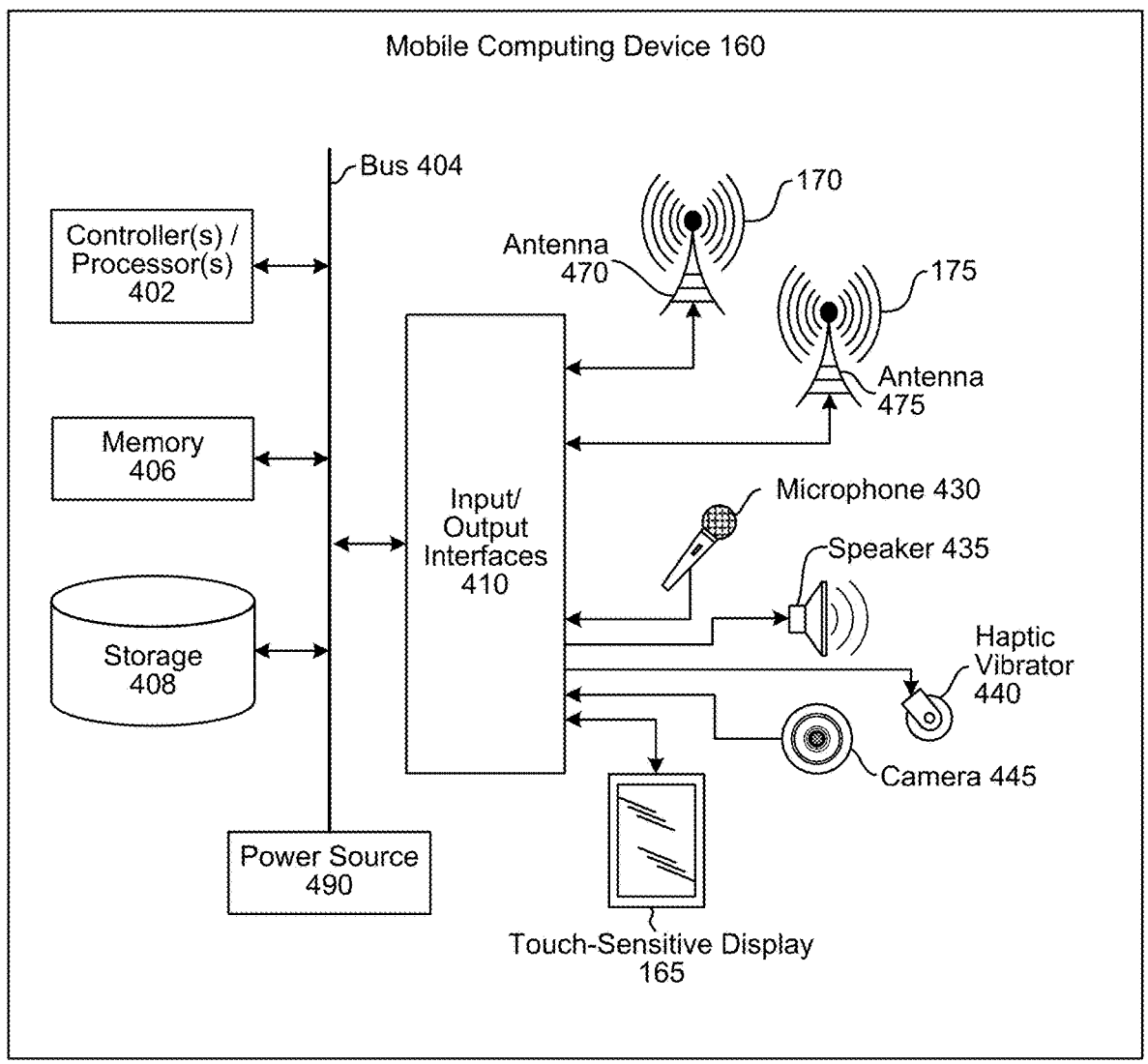
FIG. 4 is a block diagram conceptually illustrating example electronic components of the mobile computing device of FIG. 1.

FIG. 4 is a block diagram conceptually illustrating example components of the mobile computing device of FIG. 1. In a typical implementation, the computing device 160 is a smartphone or tablet computer with a touch-sensitive display 165.

The device 160 may include one or more controllers/processors 402, that may each include a central processing unit (CPU) for processing data and computer-readable instructions, and a memory 406 for storing data and instructions. The memory 406 may include volatile random access memory (RAM), non-volatile read only memory (ROM), and/or other types of memory. The device 160 may also include a data storage component 408, for storing data and controller/processor-executable instructions (for example, instructions for the software application that performs the processes and generates the user interfaces illustrated in FIGS. 5-8). The data storage component 408 may include one-or-more types of non-volatile solid-state storage, such as flash memory, read-only memory (ROM), magnetoresis-tive RAM (MRAM), phase-change memory, etc. The device 160 may also be connected to removable or external non-volatile memory and/or storage (such as a removable memory card, memory key drive, networked storage, etc.) through the input/output device interfaces 410.

Computer instructions for operating the device 160 and its various components may be executed by the controller(s)/processor(s) 402, using the memory 406 as temporary "working" storage at runtime. The computer instructions may be stored in a non-transitory manner in non-volatile memory 406, storage 408, or an external device. Alternatively, some of the executable instructions may be embedded in hardware or firmware in addition to or instead of in software.

The input/output (I/O) interfaces 410 provide the device 160 with connectivity and protocol support. A variety of input and output connections may be made through the input/output interfaces 410. For example, radio frequency (RF) antenna 470 may be used to provide connectivity to the wrench 100 via communication link 170. The same RF antenna 470 or another antenna 475 may be used to provide connectivity to the network 180 via communication link 175.

A variety of protocols may be supported by the I/O device interfaces 410 to support the links 170/175. The protocol/radio access technology used for each link 170/175 may be different. For example, the communication link 170 may use a protocol such as Wi-Fi Direct, or a personal area network (PAN) protocol such as Bluetooth, Bluetooth Smart (also known as Bluetooth low energy), Wireless USB, or ZigBee (IEEE 802.15.4). The communication link 175 may be a wireless local area network (WLAN) link such as a flavor of Wi-Fi, or a cellular communications data protocol associated with mobile broadband, LTE, GSM, CDMA, WiMAX, High Speed Packet Access (HSPA), Universal Mobile Telecommunications System (UMTS), etc.

The input/output interfaces 410 may support audio/video (A/V) user interfaces, such as the touch sensitive display 165, a microphone 430, a speaker 435, a haptic vibrator 440, and a camera 445. The input/output interfaces 410 may also support other types of connections and communications protocols. For example, the device 160 may also include a wired interface such as a USB port (not illustrated).

The device 160 may include an address/data bus 404 for conveying data among components of the device 160. Each component within the device 160 may also be directly connected to other components in addition to (or instead of) being connected to other components across the bus 404. The device 160 also includes a power source 490, such as a battery or a fuel cell, along with associated charging circuitry (not illustrated).

The software application stored in storage 408 and executed by the controller(s)/processor(s) 402 of the mobile computing device 160 provides user interfaces that allow a technician to configure and interact with the electronic torque wrench 100, and to provide additional functionality. While some of the functionality may be available directly via the user interface 220 of the torque wrench, the added capabilities of the device 160 provides additional processing power, and leverages the connection(s) 175 to the network(s) 180, such as connectivity to the external database(s) 195.

Via the wireless link 170, a technician can use the software application on the device 160 to configure the wrench 100, such as configuring how the wrench 100 provide a technician feedback using the haptic vibrator 340, such as to indicate when a target torque or target angle is achieved.

A technician may also use the software application on the device 160 to set up or configure preset values, and set preset numbers and names for certain operations. Preset values may include user defined torque and/or angle settings and measurement units, such as torque and angle target values with minimum and maximum tolerances and/or a batch counter. The preset values and names can be set for custom operations, as well as augmenting or replacing the values and names provided by the database(s) 195. Among other things, preset values may be set for non-database aftermarket parts, and to replace values received from the database(s) 195 with custom values. As used herein, "names" refer to text strings. The preset values, and set preset numbers and names may be transmitted to the wrench 100, and displayed on the wrench to a user to identify the fastening operation to be performed.

The software application on the device 160 may be used to configure the wrench 100 to set a fastener preset type to which torque is to be applied, such as, for example, torque, angle, torque then angle or torque and angle measurement modes. The software application on the device 160 may be used to configure the wrench 100 with an allowable direction of measurement for measuring torque and rotation/angle application amounts. The software application on the device 160 may be used to configure the wrench 100 to prevent measuring torque in an incorrect or wrong direction, prevent measurement of a fastening task or operation before the target values have been configured, and/or prevent technician/operator changes and wrench use if the wrench 100 is due for calibration or another error is detected.

The software application on the device 160 may be used to configure the wrench 100 to use an offset or adapter when measuring torque. For example, by configuring the wrench 100 with an offset or adapter length. For example, an adapter may be coupled to the wrench 100, which changes a length of the torque wrench and changes the measured torque reading. The wrench 100 receives the offset or adapter length, and the wrench 100 automatically compensates for the change in length to allow the wrench 100 to display a compensated measured torque value.

The software application on the device 160 may be used to configure the wrench 100 with automatic sequencing through preset operations to prevent any operation other than the use of the preset target fastener operations, to prevent further use after a preset torque sequence is completed, to prevent further use after over torque or rotation, and/or to redo a preset torque or angle operation.

The software application on the device 160 may be used to configure the wrench 100 to determine the elapsed time from the last calibration date to notify the operator of the number of days before calibration is required. The software application on the device 160 may be used to configure the wrench 100 to determine the number of torque cycles since the last calibration date and to notify the operator of the number of cycles left before calibration is required. The software application on the device 160 may be used to configure the wrench 100 to indicate that the wrench 100 requires calibration following an expired calibration interval or number of torque cycles since last calibration. The software application on the device 160 may also be used to configure the wrench 100 to prevent the use of the wrench 100 once calibration is required.

The wrench 100 may transmit batch, torque, angle, and/or orientation information to the device 160 in real time, based on data from the sensors 320/324/328. The software application on the device 160 may record the data and information in one-or-more log files to be stored in storage 408, forwarded via the communication connection 175, and/or uploaded to external storage. The software application may use the log information to generate and send reports for auditing purposes, and determine whether the rate of force application, torque values, and angle values are consistent with customer and/or regulatory compliance requirements.

For example, a fastener operation or preset may include applying a minimum target torque and/or rotational angle value. In this example, the wrench 100 receives the preset information from device 160, and indicates that the target value(s) has been reached. If the applied torque and/or angle continues to increase, the wrench 100 may provide a warning indication, such as an audible sound, light, etc., to indicate that the upper limit has been exceeded. The results of the operation may also be wirelessly transmitted by the wrench 100 to the device 160 for processing and data logging.

The software application may also generate and output graphic plots in real time via display 165, such as graphs illustrating torque versus time, torque versus angle, etc. The application may compare fastener orientation information from a database 195 with received data from orientation sensor 328 to automatically track which work pieces have been completed.

The software application may obtain torque and angle settings from the database 195, and substitute or augment those setting with presets values stored on the device 160. The wrench 100 may also be configured to output a preset name for a workpiece to the display 230, rather than a name assigned to the operation by the database 195. For tasks where the software application downloads torque and/or angle values for multiple tasks to the wrench 100 in a batch, a technician may choose which work piece to operate on via the user interface 220 on the wrench 100 itself, or via an interface provided on the device 160 by the software application. In an alternative to batch downloading, the software application may download torque and/or angle values to the wrench for one workpiece at-a-time.

The technician may interactively select which workpiece included in a fastening procedure to work on, or in a slaved-mode, the software application may control the order in which work pieces are automatically selected, dictating to the technician the order in which a fastening procedure comprising multiple work pieces is carried out. Upon selection, the wrench 100 is configured with the torque and/or angle values for that work piece. Automatic selection in slave mode may be used for error proofing where customer or regulatory requirements require an order of steps.

For many jobs, technicians need flexibility to carry out fastening procedures based on their own preferences and experiences, preferring not to be locked into a fixed procedure. Failing to provide technicians such flexibility increases the likelihood that they will ignore or otherwise disregard manufacturer specifications. In addition, looking up manufacturer specifications typically adds a quarter-hour to the time required to complete a task, further discouraging use of such specifications. To address these needs, the software application on the device 160 makes it quick and easy for a technician to obtain the correct specifications, while providing them increased flexibility on how fastening procedures are carried out.

FIGS. 5A to 5H illustrate examples of graphical user interfaces (GUIs) provided by the software application executed by the mobile computing device 160, to configure and interact with the electronic torque wrench 100, and to provide additional functionality. In the GUI figures, editable text fields are boxed to indicate that the fields may be edited via the GUI. It will be appreciated that any GUI interface, user interface, and/or menu operation can be used without departing from the scope and spirit of the present invention.

Figure 5B:
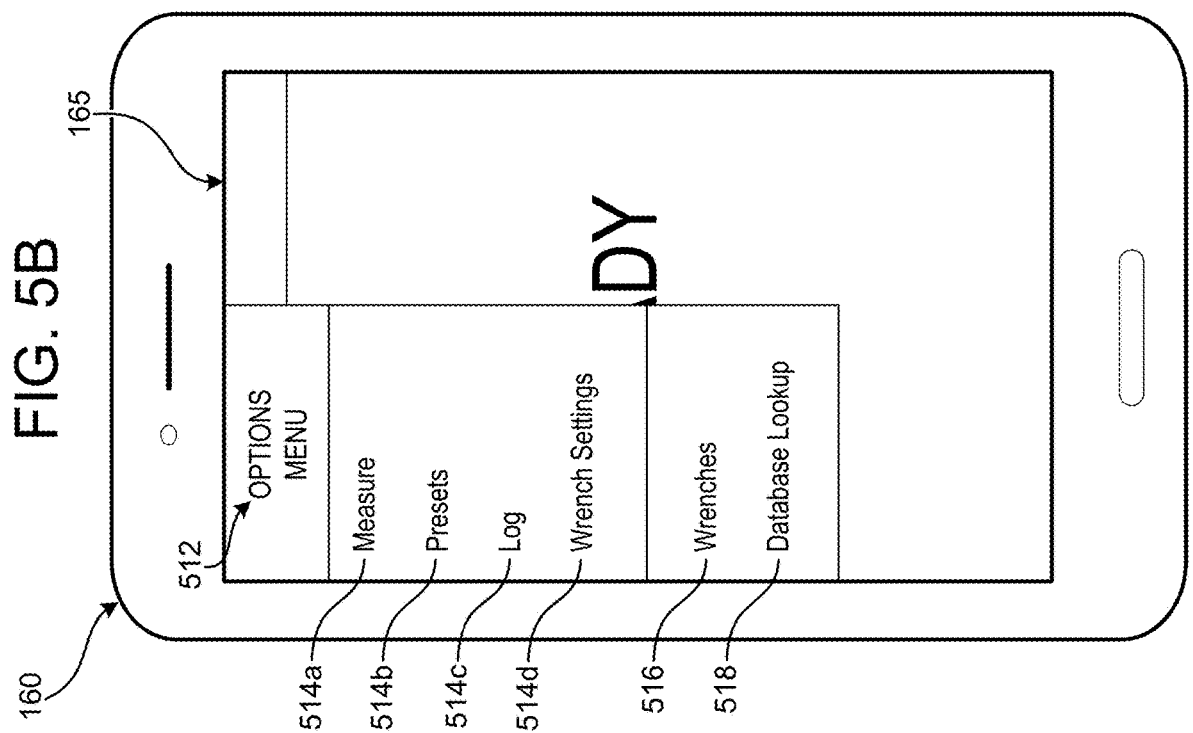
FIGS. 5A to 5L illustrate examples of user interfaces provided by the software application executed on the mobile computing device of FIGS. 1 and 4, to configure and interact with the electronic torque wrench of FIGS. 1 to 3, and to provide additional functionality.
Figure 5A:
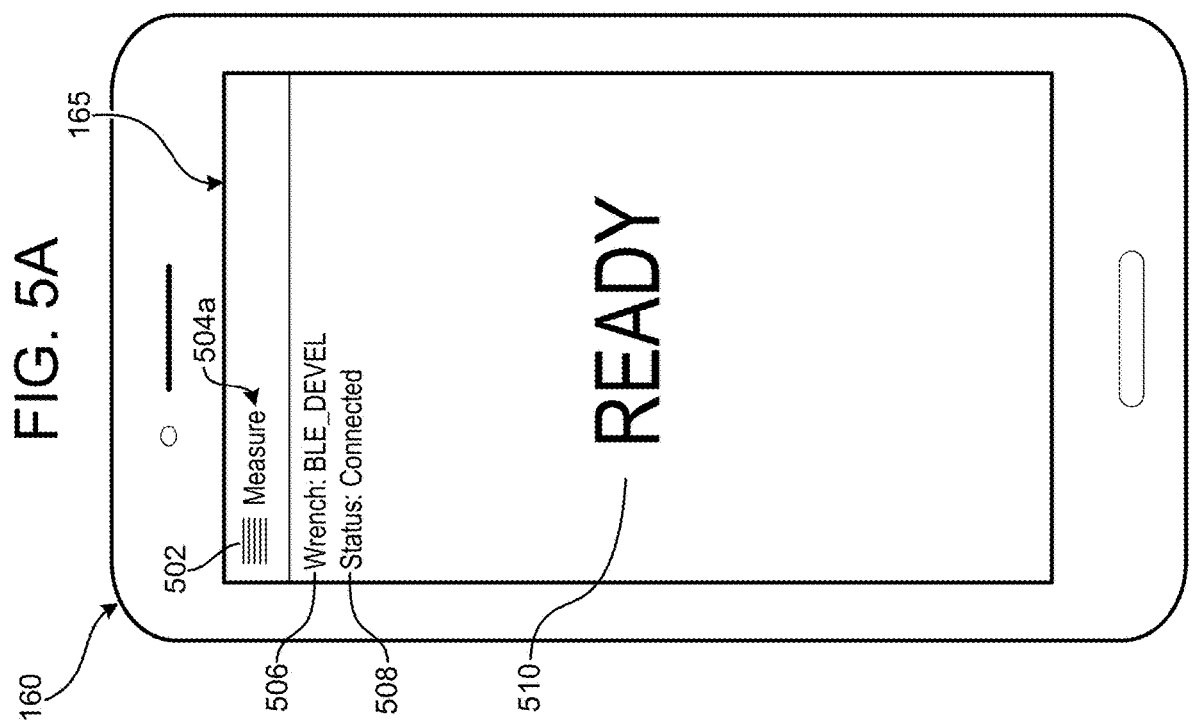

FIG. 5A illustrates an example of a startup "splash" screen of the software application, after a communications link 170 is established with the torque wrench. The screen includes a navigation icon 502. Actuation of the icon opens an options menu (menu 512 in FIG. 5B). There is a mode indicator 504a identifying that a current operational mode of the application is "measure," which would typically be used as default mode. The screen also identifies (506) the wrench 100 to which the software application has been configured to connect, and the current state (508) of the connection 170. A "ready" message (510) indicates that the software application is connected and ready to interact with the wrench 100.

FIG. 5B illustrates an example of features of the software application that are accessible via the options menu 512. As illustrated, the features include "measure" 514a, "presets" 514b, "log" 514c, "wrench settings" 514d, "wrenches" 516, and "database lookup" 518.

Figure 5D:
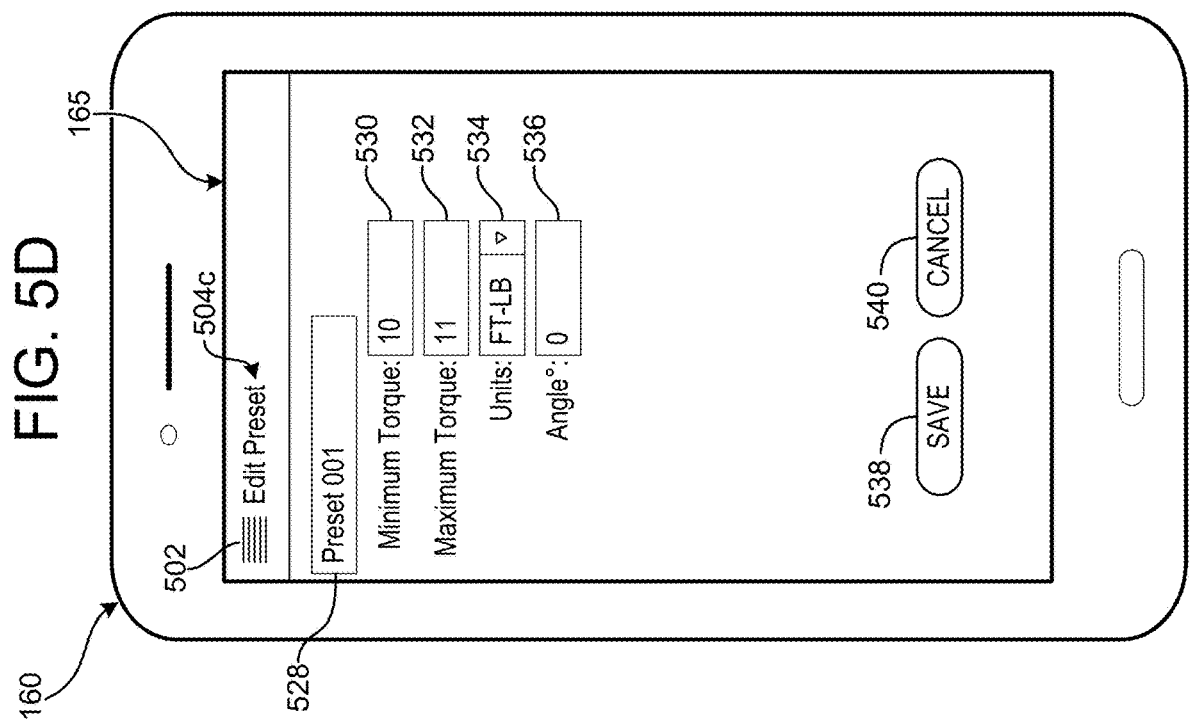
Figure 5C:
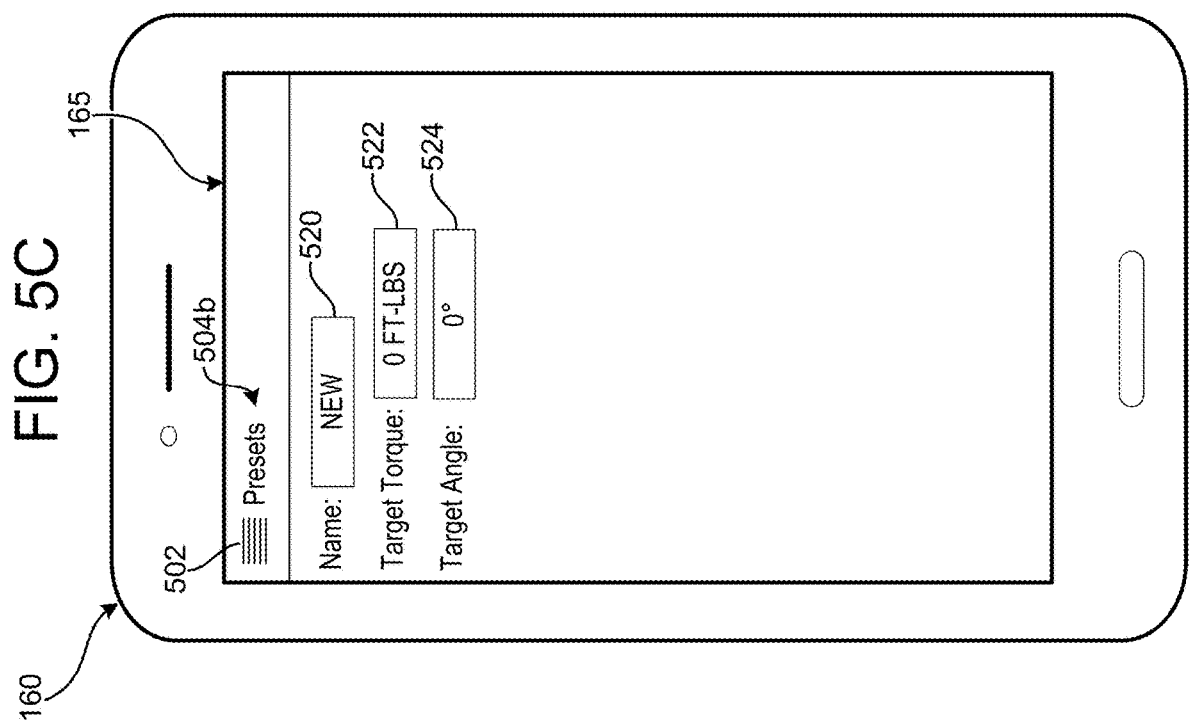

FIG. 5C illustrates an example of the "presets" feature 514b. The mode indicator 504b identifies that the current operational mode is "presets." Selecting the presets feature causes the software application to upload any presets already stored on the wrench 100, and display those presets. As illustrated, there are no presets stored on the wrench 100 for the software application to upload, so a user is presented with an interface comprising a "NEW" field 520, a "Target Torque" field 522, and a "Target Angle" field 524. Selecting any of these fields launches an interface to define a new preset. If existing presets are uploaded and displayed, a user can select and edit each preset's setting, in addition to creating new presets. Presets may be, for example, custom presets as might be fastening procedures used for aftermarket parts.

FIG. 5D illustrates an example of the "edit preset" feature, which may be used to edit an existing preset or customize a new preset. The mode indicator 504c identifies that the current operational mode is "edit preset." Editable fields allow a technician to change any of the setting associated with a preset, including the preset's name 528, a minimum torque 530 for proper fastening torque, a maximum torque 532 for indicating over torque, the units 534 used for the preset's torque, and an angle 536 (which may include a minimum target value for proper fastener rotation and a maximum target value for indicating over rotation). Once changes are made, the changes can be saved using a "save" button 538, or discarded using a "cancel" button 540.

In an example, the device 160 may send or transmit a wireless message to the wrench 100 to set a preset minimum target torque value for a fastener. The message can also contain a torque maximum value. An optional message can be transmitted to set the target torque value. The wrench receives the optional target torque value and displays the value on the wrench 100 if set, otherwise the minimum target torque value is displayed. When the minimum target torque value is applied to the fastener or the maximum torque is exceeded, the wrench 100 wirelessly transmits the torque results to the device 160.

Figure 5F:
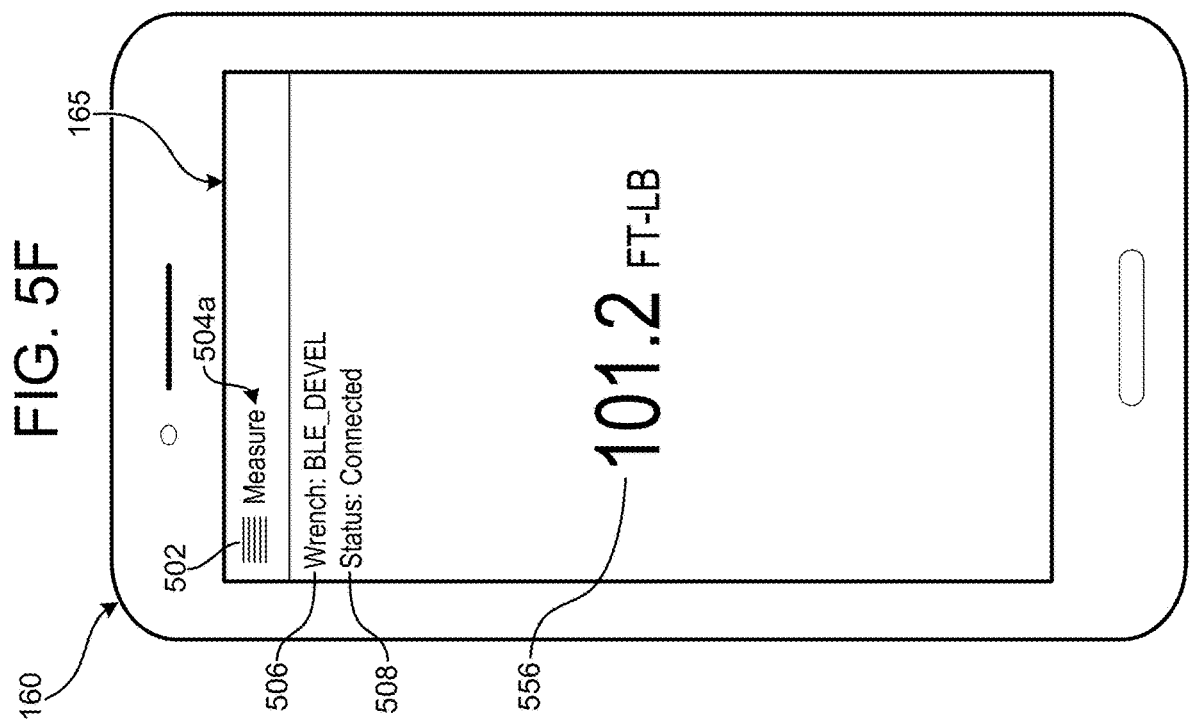
Figure 5E:
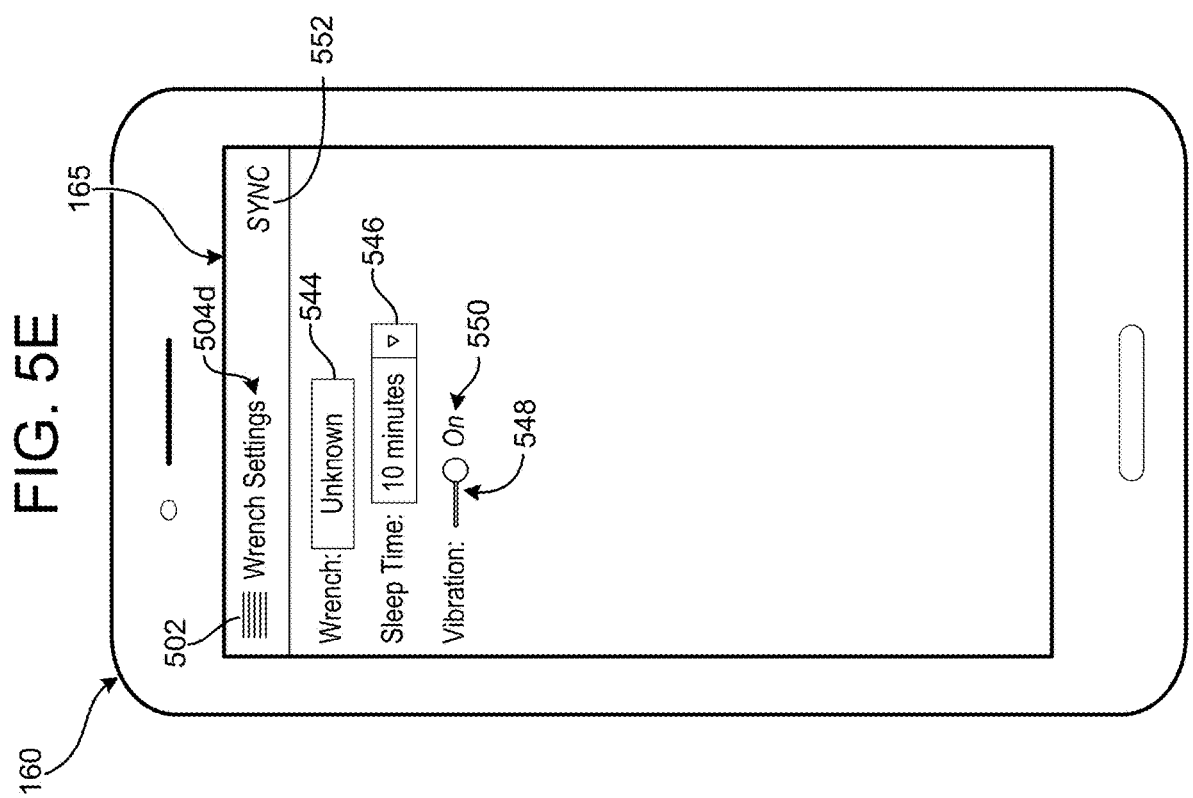

FIG. 5E illustrates an example of the "wrench settings" feature 514d. The mode indicator 504d identifies that the current operational mode is "wrench settings." The software application uploads the current wrench settings from the wrench 100, and displays the current values. As illustrated, the editable settings include the wrench's name 544, a sleep timer 546 that the wrench's processor/controller 302 uses to determine when to enter a low-power state after a period of inactivity, and whether the wrench's haptic vibrator 340 to generate vibration feedback. As illustrated, the vibration-setting interface is a slider 548 with a text indication 550 that indicates whether vibration is enabled or disabled. When a change is made to any of the wrench settings, the software application downloads the change to the wrench 100. A "sync" indicator 552 activates when the software application is uploading from or downloading to the wrench 100. The illustrated wrench settings are examples, and other or different settings may be included depending on (among other things) the capabilities of the wrench 100, such as settings for the brightness of a backlight included with the display 230, whether acoustic feedback is provided via speaker/transducer 335, the tones used by for acoustic feedback, etc.

FIG. 5F illustrates an example of the wrench back in "measure" mode. The software application receives torque, angle, and/or orientation data from the wrench 100 via communications link 170. Each type of data may be received at a sampling rate specified for the respective data type in software, firmware, or hardware. The sampled data is processed by the processor/controller 302 and provided to the software application on the device 160 in real time, with continuous updates sent via communications link 170 (e.g., several times per second). As an alternative, instead of sending continuous updates to the device 160, the wrench 100 may send an update whenever a torque, angle, and/or orientation value changes by a threshold amount (e.g., 0.1 ft-lbs, 0.1 degrees, etc.). With either approach to updating, depending upon the fastening procedure being performed, the software application outputs a current peak fastening value (556) to the display 165. As illustrated, the current peak fastening value (556) is "101.2 ft-lb." The screen continually updates to show the peak torque of each wrench cycle as the wrench 100 is used. The peak value will also be saved to a log file on the device 160. If the fastening procedure includes rotating the work-piece by a certain angle after a specified torque is reached, the display may switch to displaying angle information, or display both torque and angle information.

Figure 5H:
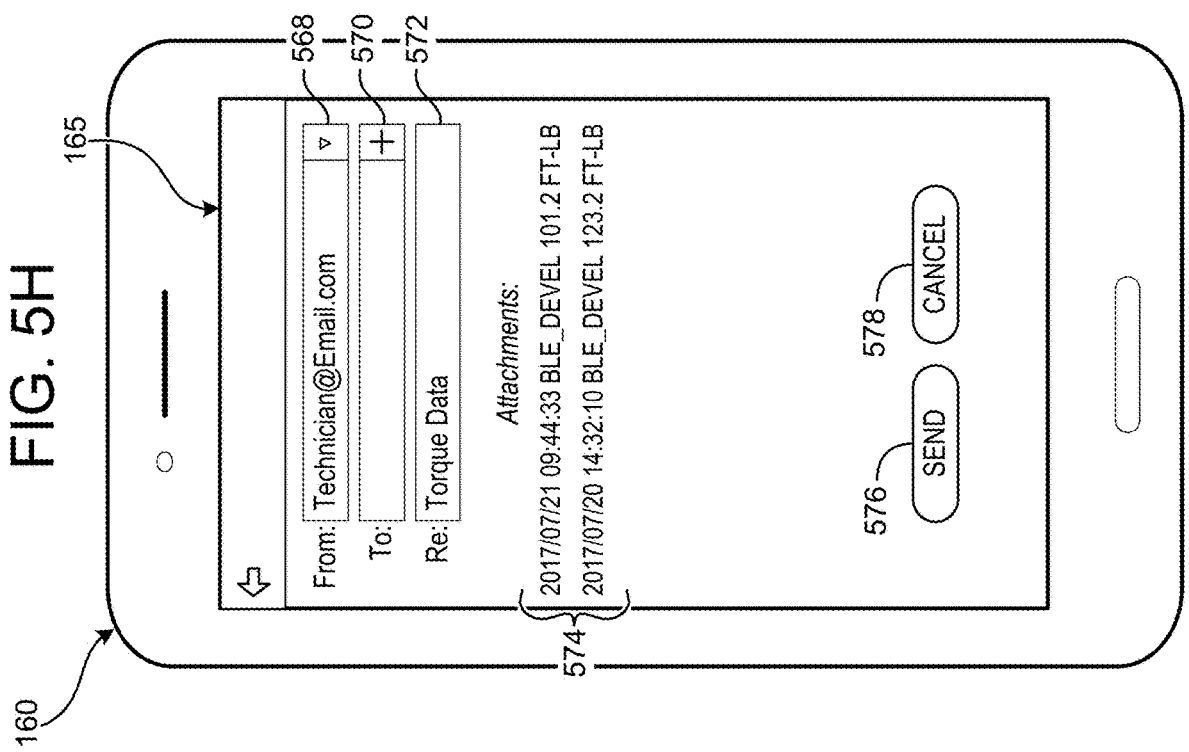
Figure 5G:
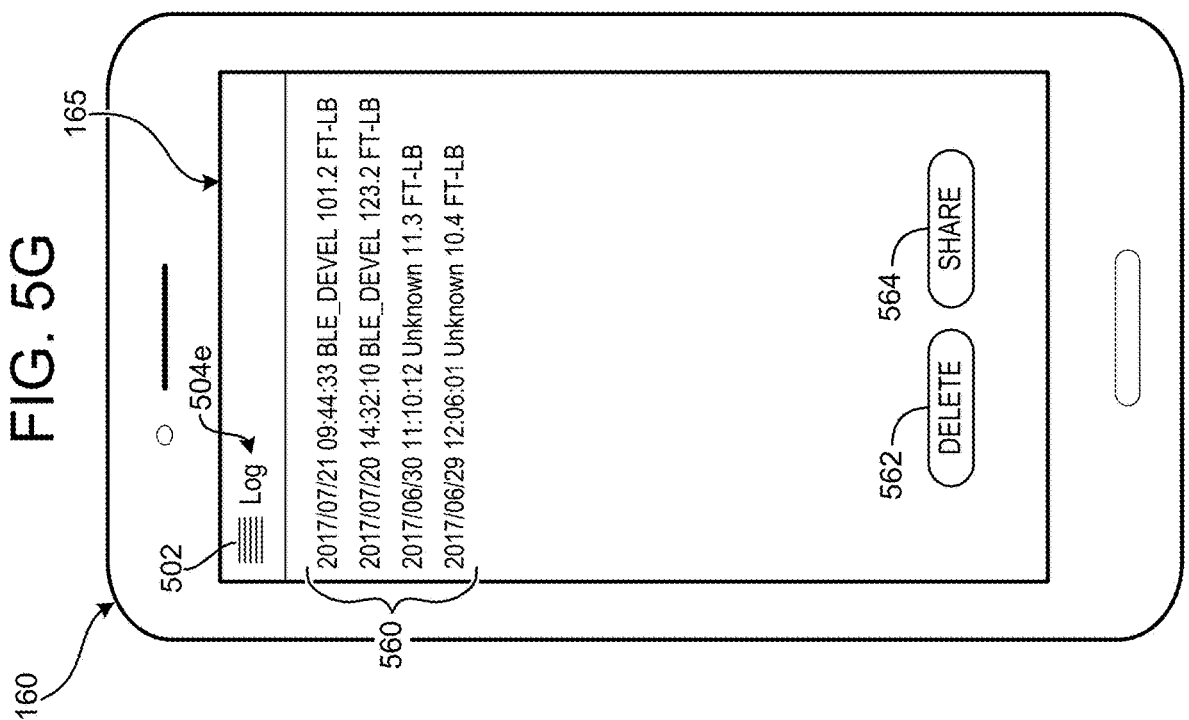

FIG. 5G illustrates an example of the "log" feature 514d. The mode indicator 504e identifies that the current operational mode is "log." The log screen shows the current log file contents 560 stored on the device 160. All of the log files are transportable to other devices. The device user is able to select log files 560 (e.g., by touching record names via the touch-sensitive display 165 to make a selection), delete any unwanted records (e.g., using delete button 562), and share selected log contents (e.g., using share button 564) using any sharing application available on the device 160, such as e-mail, Dropbox, etc.

FIG. 5H shows an example of sharing selected log files 574 via e-mail. The software application or the e-mail application may automatically populate the "from" field 568, and the software application may automatically populate the subject field 572. The user populates the "to" field 570 in the ordinary manner used by the e-mail application, and selects the "send" button 576 to send or the "cancel" button 578 to cancel.

Figure 5J:
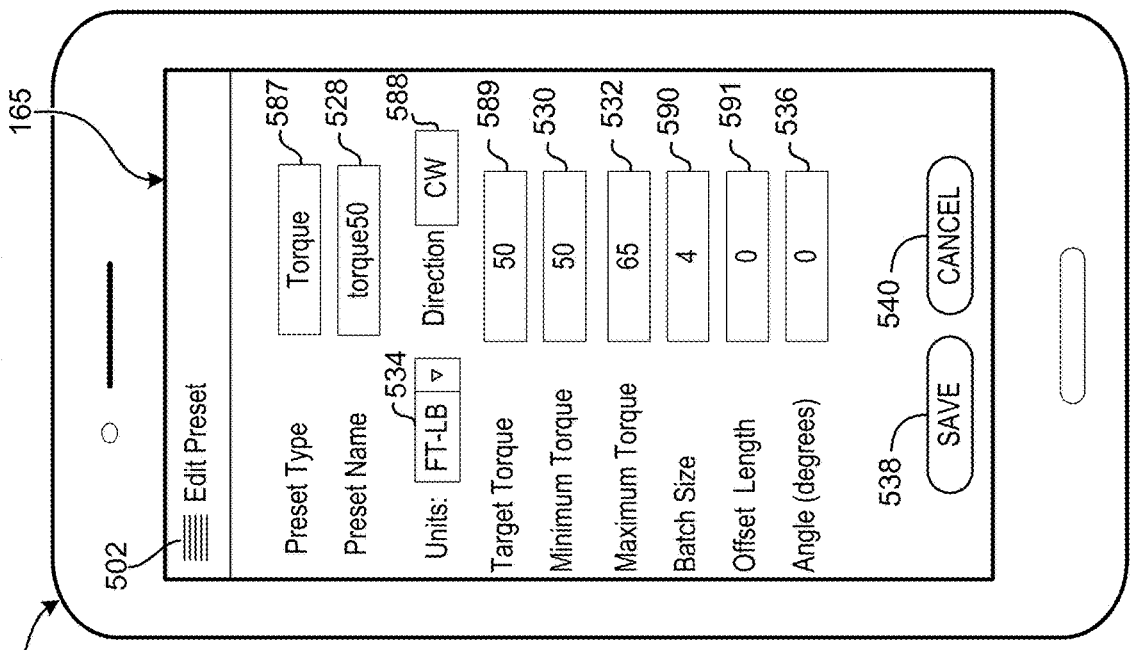
Figure 5I:
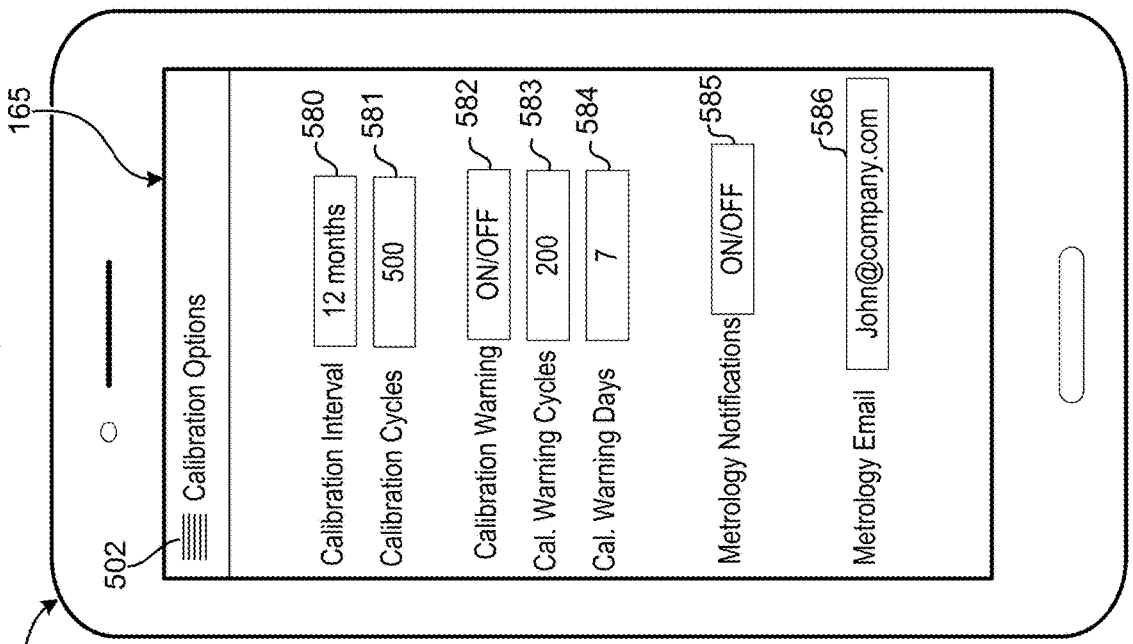

FIG. 5I shows an example of calibration options that the device 160 may be used to configure for the wrench 100. The editable fields include a calibration interval field 580 where a desired number of months can be set, a calibration cycles field 581 where a number of cycles can be set, a warning field 582 where it can be selected whether or not warnings are to be provided, a calibration warning cycle field 583 where a number of cycles can be set for purposes of the warning, and a calibration warning days field 584 where a number of days can be set for purposes of the warning. A notification field 585 can also be present where it can be selected whether or not notification are sent to an email address provided in an email field 586. This allows the wrench and software application running on the device 160 to determine the elapsed time from the last calibration date to notify the operator of the number of days before calibration is required to configure the wrench 100 to determine the number of torque cycles since the last calibration date and to notify the operator of the number of cycles left before calibration is required. The software application on the device 160 may be used to configure the wrench 100 to indicate that the wrench 100 requires calibration following an expired calibration interval or number of torque cycles since last calibration. The software application on the device 160 may also be used to configure the wrench 100 to prevent the use of the wrench 100 once calibration is required.

FIG. 5J illustrates another example of the "edit preset" feature, which may be used to edit an existing preset or customize a new preset. Editable fields allow a technician to change any of the setting associated with a preset, including a preset type 587 (such as torque, angle, torque and angle—torque then angle, etc.), the preset's name 528, the units 534 used for the preset's torque, a direction of measurement 588, a target torque value 589, a minimum torque 530 for proper fastening torque, a maximum torque 532 for indicating over torque, a batch size 590, an offset length 591, and an angle 536 (which may include a minimum target value for proper fastener rotation and a maximum target value for indicating over rotation). Once changes are made, the changes can be saved using a "save" button 538, or discarded using a "cancel" button 540. With regard to the offset length 591, an adapter may be coupled to the wrench 100, which changes a length of the torque wrench and changes the measured torque reading. The wrench 100 receives the offset or adapter length 591, and the wrench 100 automatically compensates for the change in length to allow the wrench 100 to display a compensated measured torque value.

Figure 5L:
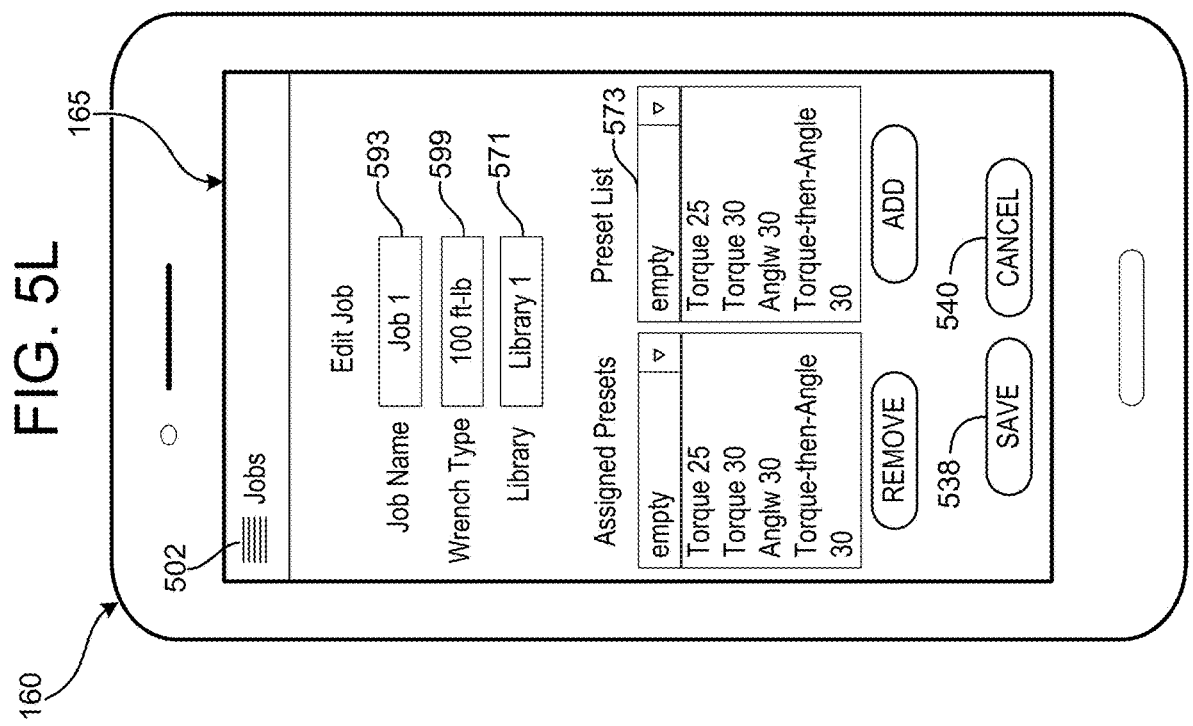
Figure 5K:
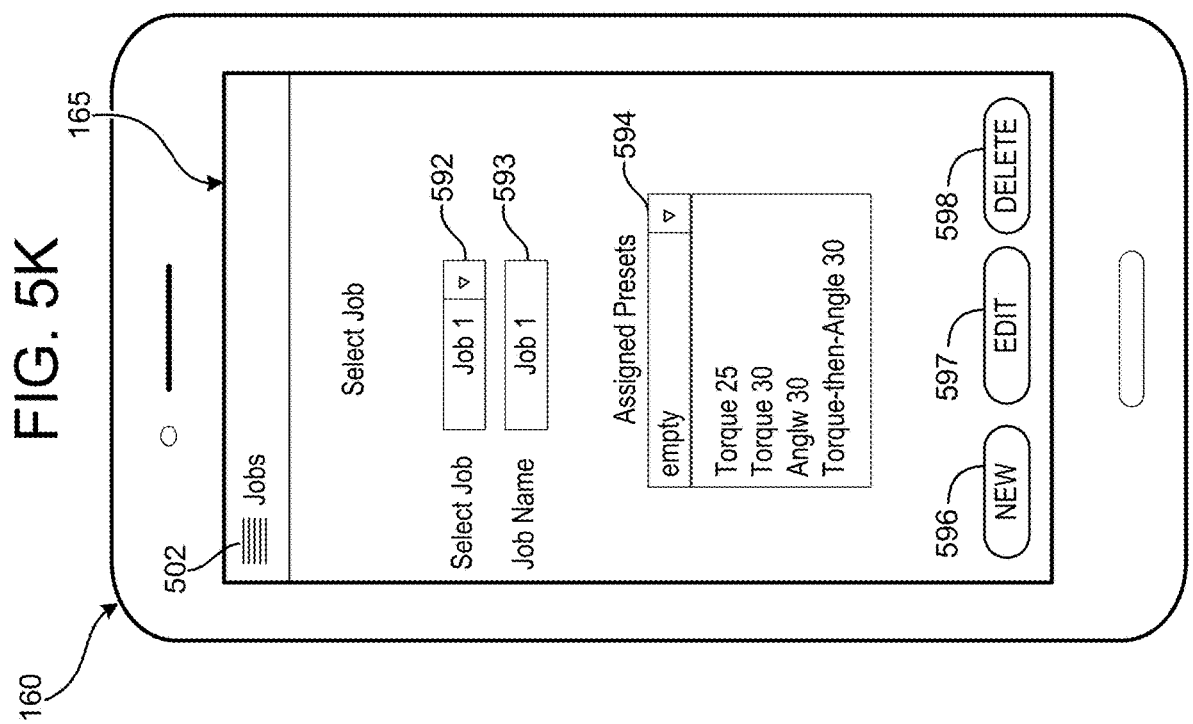

FIGS. 5K and 5L illustrate an example of the Jobs feature. The device 160 and/or application running on the device 160 can be used to set and enable "Job" mode on the wrench 100. The Job mode is advantageous when a supervisor wants an operator/technician to implement a torqueing sequence in a particular order. A Job mode may require an operator or technician to perform one or more configured preset operations sequentially. In Job mode, the wrench 100 is locked and only the preset modes/operations are executable in the sequence they are numbered. The first configured preset is displayed when Job mode is enabled. When the first configured preset is completed, the wrench 100 automatically switches to the next configured preset.

Editable fields allow a technician to change any of the setting associated with a Job, including selecting a Job 592, editing a job name 593, and view one or more assigned presets 594 to the Job. Once a Job is selected, the Job can be edited or deleted using a "edit" button 597, or deleted using a "delete" button 598. A new Job can also be created using a "new" button 596. A new Job can be created or an existing Job edited in the edit Job feature illustrated in FIG. 5L. Referring to FIG. 5L, editable fields allow a technician to change any of the setting associated with a Job or create a new Job, including the Job name 593, wrench type 599, library 571. Presets 573 may also be added to or removed from the assigned presets 594 using add or remove buttons. Once the changes are made, the changes can be saved using a "save" button 538, or discarded using a "cancel" button 540.

The user interfaces associated with the "wrenches" option 516 in the options menu 512 of FIG. 5B are not illustrated, and depend in part on the communications protocol used to connect the wrench 100 and the device 160. For example, if a variant of Bluetooth is used for the communications link 170, the wrenches option 516 will include a list of wrenches previously paired with the device 160, indicate which wrench on the list the software application is currently configured to use, allow the user to select a wrench from the list to which the software application should connect, and provide an interface to pair the device 160 to a new wrench. Such interfaces may be part of the software application, part of the operating system of the device 160, part of a separate wireless configuration tool on the device 160, or some combination thereof.

Figure 6:
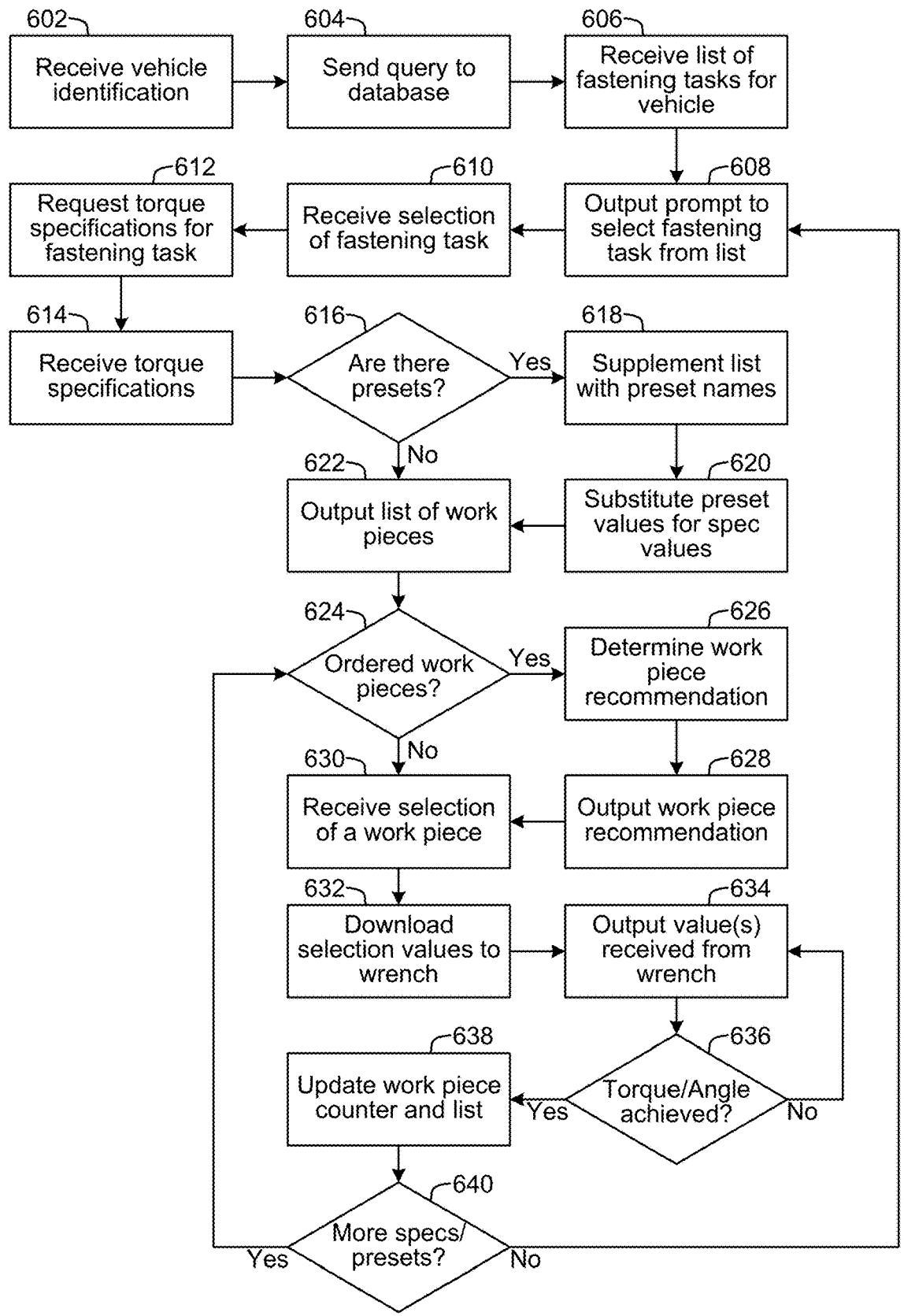
FIG. 6 is a process flow diagram illustrating example operations of the software application executed by the mobile computing device of FIGS. 1 and 4.

FIG. 6 is a process flow diagram illustrating example operations of the software application executed by controller(s)/processor(s) 402 of the mobile computing device 160 as an example of a database lookup 518. The illustrated process may be initiated, for example, by receiving a selection of the database lookup option 518 from the options menu 512 in FIG. 5B. Background operations such as data logging are omitted from FIG. 6 for brevity. FIGS. 7A to 7E illustrate examples of interactive user interfaces provided by the software application in conjunction with the process flow in FIG. 6 to configure the wrench with fastening specifications.

For example, the application receives (602) a vehicle identification. The vehicle identification information may be received, for example, by scanning a barcode or matric code on the vehicle using the camera 445, by scanning a radio-frequency identification (RFID) tag on a part or on the vehicle, by entry into the mobile computing device 160 using a virtual keyboard provided via the touch-sensitive display 165, by entry into a physical keyboard attached to the device 160 via an I/O interface 410, by navigating through a nested list of vehicles by make, model, and year, and/or by speech-to-text processing using microphone 430. Speech-to-text processing may be implemented by the device 160, or using a speech-to-text processing provided by the one-or-more servers 190.

Figure 7B:
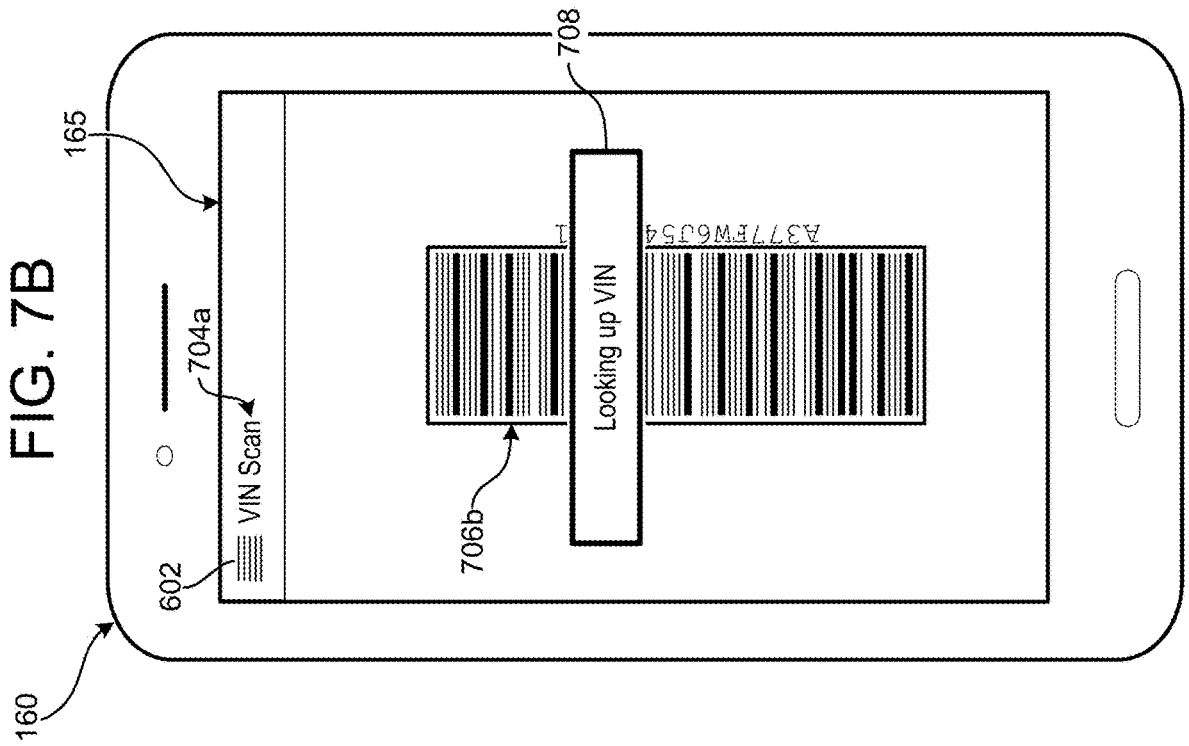
Figure 7A:
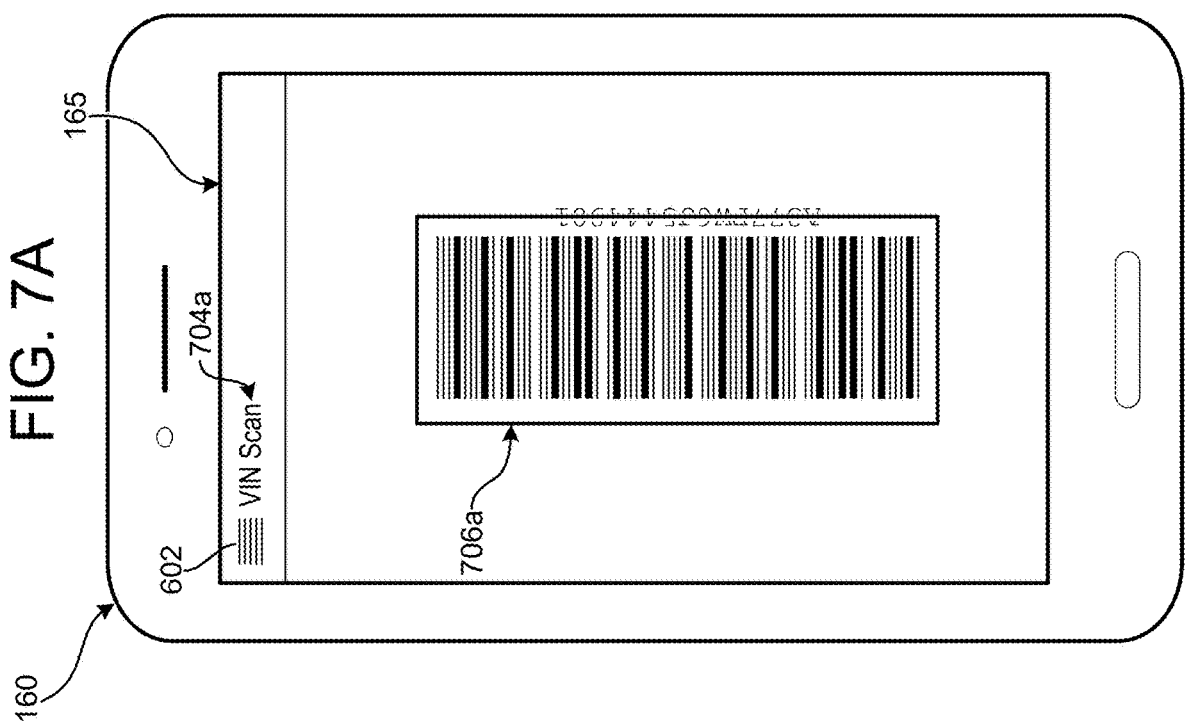

FIG. 7A illustrates the software application performing a vehicle identification number (VIN) scan as an example of the process for receiving (602) the vehicle information. The displayed operational mode 704a is set to "VIN Scan," and the device captures images using camera 445. The software application or a helper application perform image processing to identify the VIN in the captured image(s). The software interface may include a bounding box 706a to assist a user with positioning the device 160 relative to the VIN. The bounding box may be static, or may dynamically resize as the image processing software locks onto the features of the VIN (as illustrated by resized bounding box 706b in FIG. 7B).

Based on the vehicle identification information received by the mobile device 160, the mobile device 160 determines what vehicle is being worked upon. Depending upon how the vehicle identification information is captured, the mobile device 160 may work in conjunction with the server(s) 190 to identify the vehicle. As illustrated in FIG. 7B, the software application may output a progress message 708 to indicate that the scanned VIN has been captured and is being looked up to identify the vehicle.

The mobile device 160 sends (604) a query to a server 190 for database information about the vehicle. Based on the query, the server 190 generates a list of fastening tasks from the database 195 for the identified vehicle, and sends the list to the software application on the device 160 as a response to the query. The contents of the list may be anything from a message that no information is available for the identified vehicle, to one-or-more fastening categories (i.e., tasks) for which the database has information about the identified vehicle.

Figure 7D:
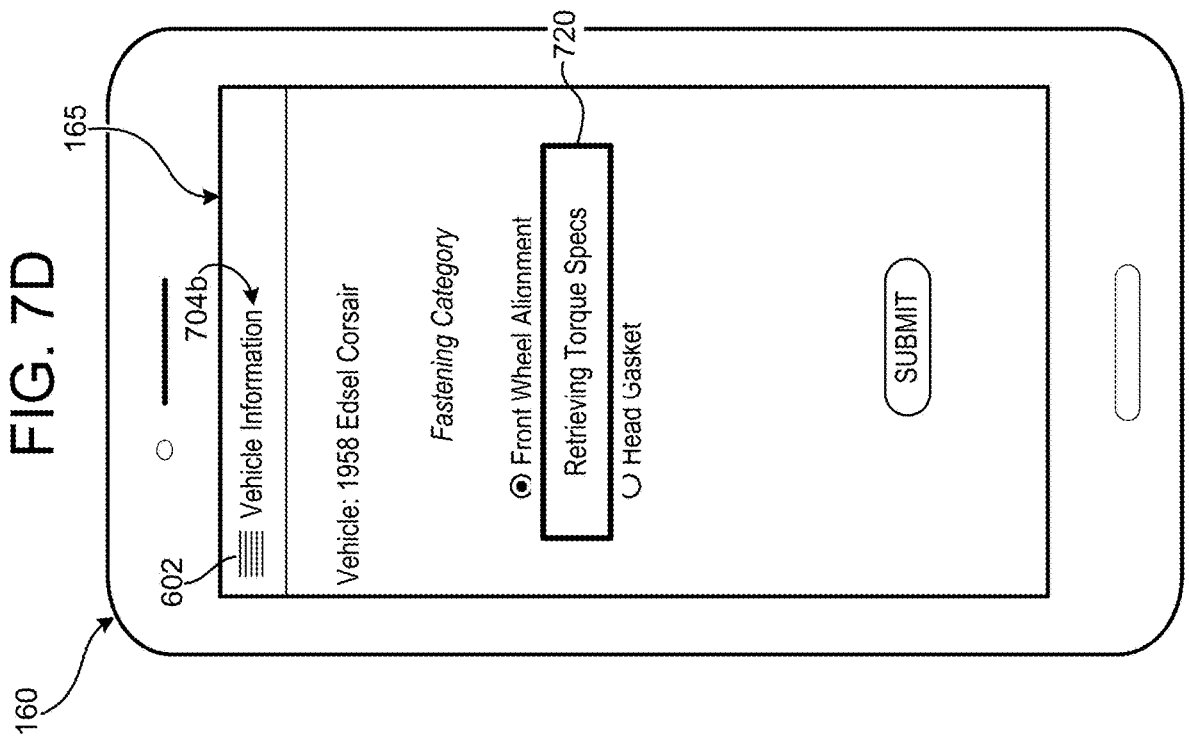
Figure 7C:
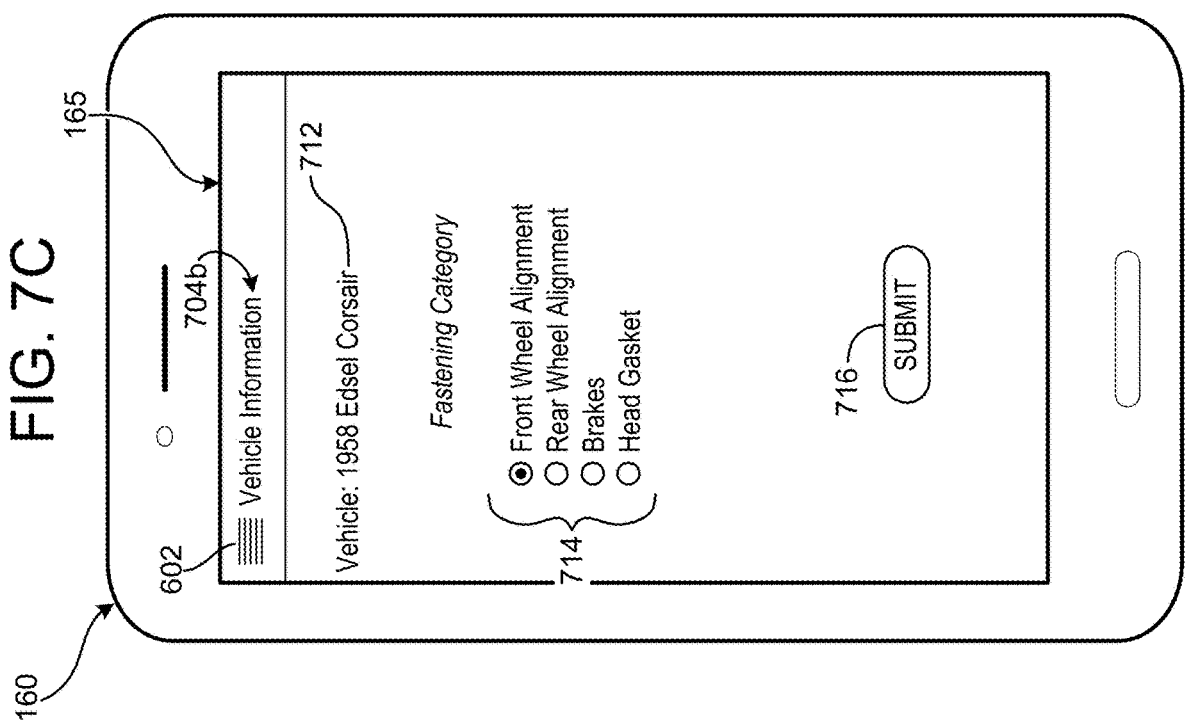

In response to receiving (606) the list of fastening tasks for the vehicle, the software application may output (608) a prompt via the display 165, enabling the user/technician to select a fastening task from the displayed list. An example is illustrated in FIG. 7C, with the displayed operational mode 704b changing to "vehicle information." The output 608 includes an identifier 712 of the vehicle (e.g., year, make, and model), and a list of fastening tasks/categories 714. The user selects a fastening task 714 from the list and presses "submit" 716 to select the task. The process may also afford the technician the ability to change the search (not illustrated) if technician is dissatisfied with the received (606) fastening task list, generating another query (604).

After receiving (610) a selection of a fastening task in response to the prompt, the software application sends (612) a request for torque specifications for the selected task back to the server(s) 190. As illustrated in FIG. 7D, the software application may output a progress message 720 to indicate that the torque specifications for the selected task are being looked up.

The server 190 that generates the list of fastening tasks 714 may be the same as or different than the server 190 that looks up the torque specification for the selected fastening task. After looking up the torque specifications in the database 195, the server 190 sends the torque specifications back to the software application on the device 160 as a response to the request (612).

After the software application receives (614) the torque specifications, a determination (616) is made as to whether any presets corresponding to the specification are stored on the device 160. The software application may make this determination (616) based on a comparison of a text string for a fastening task or other embedded code received (614) in the response with text string or code data stored on the device 160, and associated with at least one preset name or value.

If a preset name is stored on the device 160 for a received specification, the software application will supplement (618) the fastening specification list with the stored preset names. The software application may associate a preset with a specific manufacturer and task, rather than a specific vehicle model and year, automatically applying a technician's preferred nomenclature without requiring each occurrence to be individually programmed. For example, a technician performing a "Front Wheel Alignment" (fastening task) on a 2003 Toyota Avalon might set a nickname for lower shock absorber nuts (work pieces) to be "shock nuts." Thereafter, whenever the application receives a "Front Wheel Alignment" specification that includes values for lower shock absorber nuts on any Toyota, the software application may automatically supplement the information received from the database 195 with the preset nickname "shock nuts." After the specification are downloaded to the wrench 100, the wrench 100 may display the preset name on the display 230, rather than the name of the fastening specification received from the database 195.

The software application also determines whether any preset values have been set in the past to override a received torque specification. In the past, a technician may have decided that a torque value received from the database 195 was not what they wanted, and manually entered a different torque value. If so, the software application may substitute (620) the preset values for the specification values from the database 195. Both the wrench 100 and the software application on the device 160 may annotate a displayed torque value to indicate that the value is based on a preset rather than database information, such as displaying preset values in a different color than database values. An interface may also provide the technician an option to choose between a previous preset value and the value received from the database.

After adjusting the torque specifications with presets, the software application output (622) a list of work pieces for the selected fastening task on the display 165. Torque and angle values may be batch or individually downloaded by the software application to the wrench 100. As illustrated FIG. 6, work piece torque values are downloaded (632) individually to facilitate some of the interactive features of the software application. However, FIG. 7E illustrates an interface that allows a technician to control which values are included in a batch download.

In FIG. 7E, the displayed operational mode 704c is "fastening specifications." The displayed list includes the titles 724a to 724c of each of the work pieces received from the database 195, torque values 726a to 726c that are the values received (614) from the database 195 and/or preset values if the software application has substituted (620) preset values, and any preset names 728a to 728c that supplement (618) the titles 724a to 724c received from database 195. Presets values and/or names can be set or adjusted by selecting the corresponding field. The technician may select which specifications will be downloaded to the wrench 100 by selecting a respective specification using selection boxes 730a to 730c, and then selecting "sync" 732. The interface may also provide (not illustrated) for entry and uploading of temporary torque values that will not be saved and applied to future tasks, which may be convenient when working with a mix of original and aftermarket equipment.

Returning to FIG. 6, the software application may provide interactive interfaces to facilitate completion of a selected task. The software application determines (624), based on information received from the database 195, whether torque should be applied to the workpieces in a particular order. For example, the torque specifications that are received (614) may indicate that the list of work pieces is an ordered list. Along with the ordered list, the software application may receive a graphical representation of the part being worked upon, with torque values in the list associated with work pieces represented in the graphic. Mapping data may be included with the graphical representation identifying where the workpieces are located within the graphic. For example, the list may include absolute or relative Cartesian coordinates, vector coordinates, or distances from the image edges, identifying the location of a corresponding work piece in the graphic. Based on such mapping data, the software application can determine the locations of the work pieces in the graphic.

If the list of work pieces is ordered (624 "Yes"), the graphic as-received may already be annotated with the recommended order in which torque should be applied to the plurality of work pieces. As an alternative, the software application on the device 160 may annotate the graphic by adding or overlaying order numbers adjacent to each work piece, as output to the display 165.

Figure 8B:
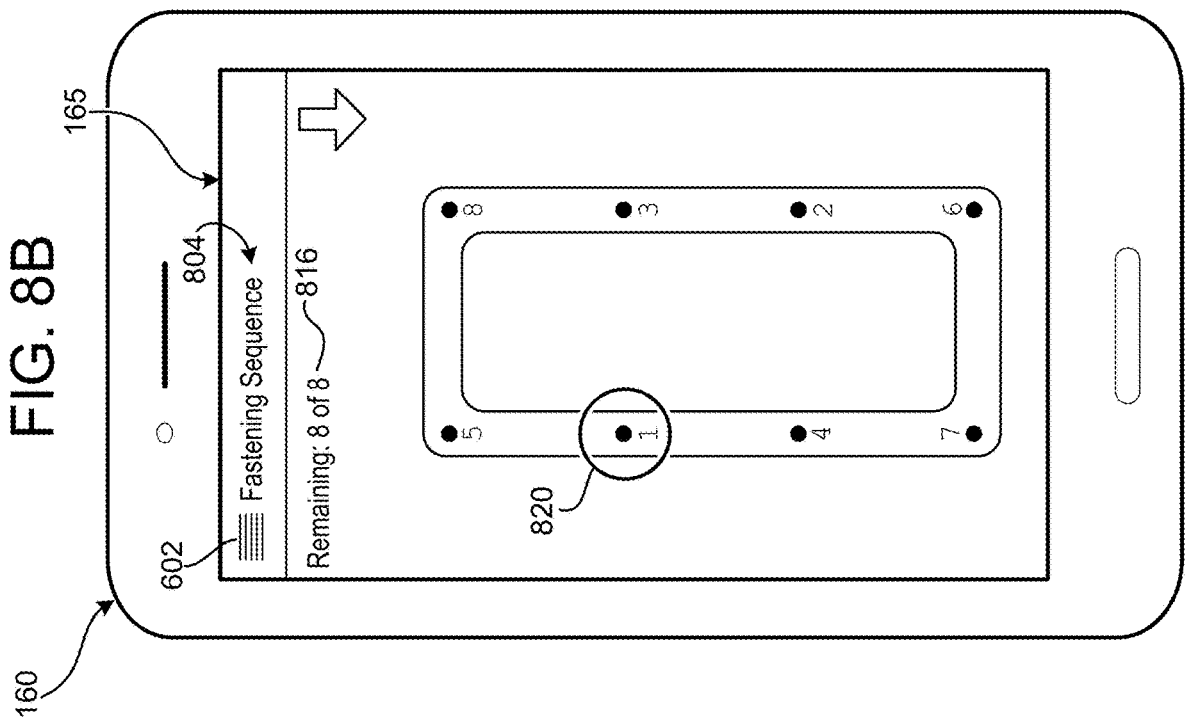
Figure 8A:
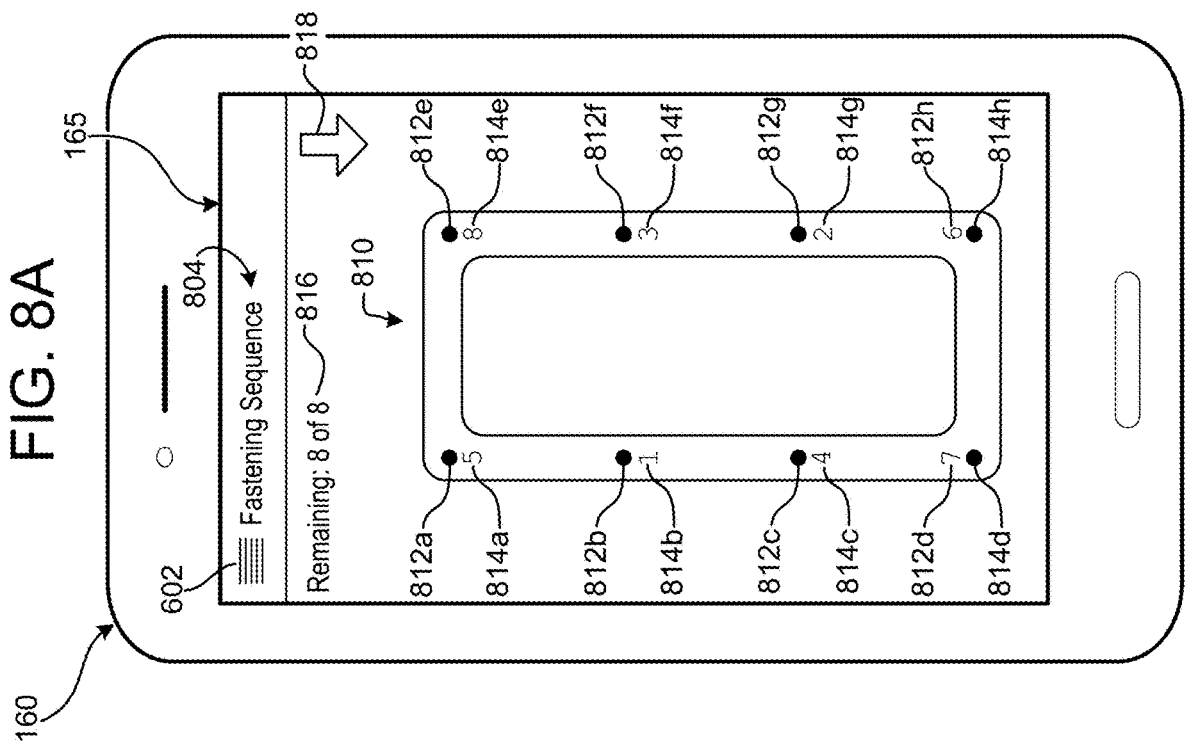

FIG. 8A illustrates an example of a simplified graphic 810 for a bolt torque sequence for a head bolt pattern. The torque and angle values for each bolt in the sequence are independent of the others in the sequence, such that each bolt may have different torque and angle values. The received graphic may be pictorial, abstract, schematic, a photograph, etc. The operational mode 804 displays "fastening sequence," and a counter 816 displays how many bolts (i.e., the work pieces) remain to be torqued.

The software application may add or overlay a visual highlight to identify each work piece 812a to 812h on the display 165, and add or overlay a sequence number 814a to 814h adjacent to each work piece. The sequence numbers may be included in list of work pieces, or the software application may generate the numbers based on each work piece's order in the ordered list. The screen may also include a graphic component to assist the technician in determining the orientation of the displayed graphic relative to the vehicle. In the example in FIG. 8A, this displayed indication of orientation is an arrow 818 pointing to the front of the vehicle.

The software application determines (626) a work piece recommendation to guide the technician. If the technician follows the sequence as-illustrated in FIG. 8A, the recommendation will correspond to the order of the sequence numbers. On the first pass, the recommendation will correspond to the first work piece in the sequence (which corresponds to workpiece 812b in FIG. 8A). However, if the technician does not follow the recommended order, an algorithm or alternative order may be used to determine subsequent recommendations, as will be described further below. The software application may also provide a warning to the user/technician if the technician does not follow the recommended order, and such a warning may be recorded.

The software application may output (628) the recommendation by distinctively highlighting the work piece in the graphic. An example of this is illustrated in FIG. 8B, where a circle 820 is graphically added around the recommended work piece 812b. The circle 820 highlights the work piece, and may be uniquely colored, flashing, animated to change shape (e.g., pulsing), etc. While a circle is illustrated as the added highlight, any sort of highlighting can be used, as the purpose is to visually distinguish the recommended work piece from the other work pieces in the graphic.

Thereafter, the software application receives (630) a selection of a work piece that is input by the user. The device 160 may receive (630) the selection based on the technician touching one of the displayed work pieces on the touch-sensitive display 165, based on the technician using the user interface 220 on the wrench 100 to select a work piece, based on speech-to-text processing, or if list of work pieces includes unique orientation information for the work pieces, based on orientation data from the wrench's orientation sensor 328. FIG. 8C illustrates an example of a technician selecting a work piece in the graphic that is different than the recommended work piece 820 in the sequence. The software application may highlight 822 the selected work piece to provide feedback to the technician, indicating that the technician's selection has been received.

If the work piece specifications are downloaded in a batch to the wrench, and the user's selection is input via the user interface 220 on the wrench 100 or determined based on wrench head orientation, then the software application may highlight (822) the selected work piece on the display 165, and advance directly to outputting (634) values received from the wrench to the display 165, as previously illustrated in FIG. 5F.

If the work piece specification were batch-downloaded and the selection is received via the touch interface 165, then the software application signals the processor/controller 302 on the wrench which work piece is to be worked upon. Otherwise, if the work piece specifications are being downloaded to the wrench on an as-needed basis, the software application downloads (632) the values for the selected work piece to the wrench 100. As torque is applied, the peak value per sensor data sample is output (634) from the display 165, as previously illustrated in FIG. 5F.

The software application continues (636 "No") to output (634) the values until the specified torque and/or angle values are achieved. When the target value(s) are achieved (636 "Yes"), the wrench 100 and/or software application 160 will output feedback (e.g., audio feedback, vibration, etc.) to indicate that the target is achieved. The software application will also update 638 the work piece counter 816, and update the list to indicate that the particular work piece has been torqued.

The process determines (640) whether there are any more work pieces remaining to be torqued. If there are not (640 "No"), the process returns to outputting (608) a prompt to select a fastening task from the list, as previously discussed in connection with FIG. 7C. The list may be updated to indicate which tasks have already been performed. Otherwise (640 "Yes"), if there are work pieces remaining, the process loops back to step 624 to determine whether the work pieces are ordered, and if they are (624 "Yes"), to determine (626) a next work piece recommendation.

As noted above, if the technician follows the recommended order, the next work piece recommendation will simply be the next work piece in the ordered list/sequence. However, if the technician elects not to follow the recommended order, selecting an out-of-order work piece that does not comport with the ordered sequence, there are several approaches that the software application may employ to determine which work piece should be torqued next.

A first approach is use alternative order data included in a table in the received (614) torque specification, indicating alternative recommendation orders to use based on which work pieces have already been torqued. This approach requires minimal computation by the device 160, but increases the amount of data that must be transferred with the torque specifications, and potentially bloats the data stored in database 195 if the table data is not computed by the server 190 on an as-needed basis.

A second approach is for the software application to query a server 190, including a list of what work pieces have already been torqued in the query, with the server 190 responding with an alternative recommendation order. This reduces the overall amount of data that must be transferred with the torque specification, but if the technician continually ignores the recommendations, the need to repeatedly communicate with the server 190 during the process risks delays in updating recommendations after each selection.

A third approach is for the software application to apply an algorithm to determine a next work piece recommendation. The algorithm may be supplied by the server 190, may be stored on the device 160 with the server 190 specifying which algorithm to use, or software application 160 may independently apply an algorithm stored on the device. The algorithm applied by the device 160 for this approach may also be used by the server 190 to generate the alternative lists provided with the first and second approaches.

Examples of the algorithm that may be used to select a next work piece to recommend include selecting the highest-priority work piece remaining to be worked on from the original list, selecting among the remaining work pieces based on a magnitude of the torques specified for the remaining work pieces (e.g., in a smallest-magnitude torque to largest-magnitude torque order, or in a largest-magnitude torque to a smallest-magnitude torque order), or geometric-based selection, such as outside-in, middle-out, and/or alternating edges, determined based on the mapping data included with the graphical representation. Geometric selection may be relative to the work pieces that have already been torqued, and/or relative to the last work piece that was torqued (e.g., selecting a work piece diagonally across from the last work piece torqued).

More than one of these algorithms may be used to make a recommendation. For example, when two-or-more algorithms select a same work piece to recommend as next, that work piece may be selected (e.g., the work piece receiving the most votes). Different algorithms may be assigned different priorities or "weights" to break ties as to which work piece should be next.

As another approach, if a final angle rotation is to be applied to a work piece after a work piece is seated, the software application may withhold the angle until after all the work pieces are seated, and then repeat the original ordered list in the original sequence, indicating the angles for the work pieces where the angle data was withheld using the initial order.

FIG. 8D illustrates an updated fastening sequence graphic representation, where the work piece counter 816 has been updated, and the work piece that was previously selected is marked 824 as completed (using different highlighting than was used to mark a recommendation 820 and a selection 822). The software application outputs 820 a next work piece recommendation, as determined (626) using one of the above-described approaches.

Figure 9:
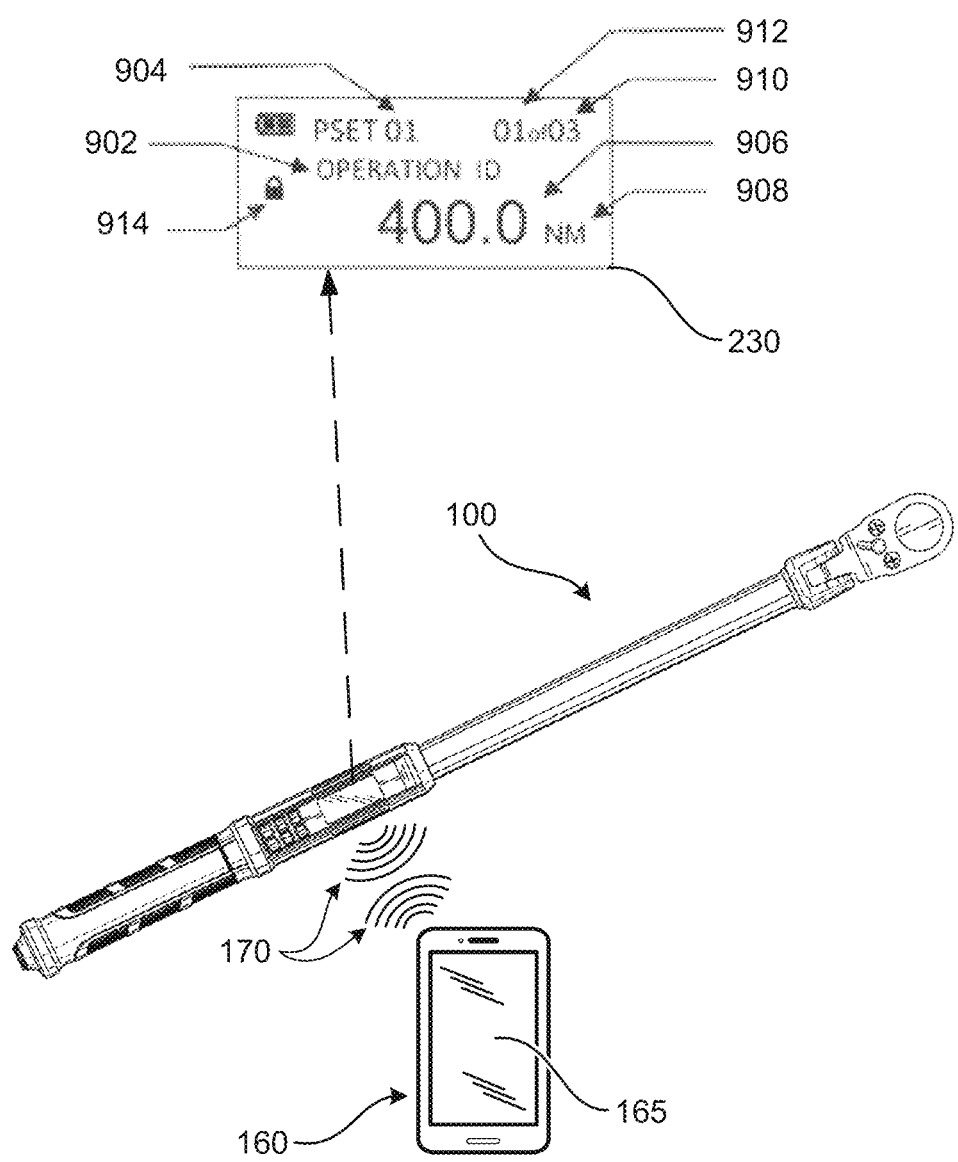
FIG. 9 illustrated an example batch operation, in accordance with an embodiment of the invention.

Referring to FIG. 9, in another example, the device 160 can be used to wirelessly transmit a message to set a number of fastener cycles (i.e., batch count) to perform. This configuration is advantageous to determine, for example, whether the user has properly sequentially torqued all the fasteners/workpieces in the batch. For example, if the batch includes 3 bolts, a typical mistake is for the user to believe that all 3 bolts have been properly torqued, but instead one or more of the bolts have been mistakenly torqued more than once, and one or more of the bolts therefore remain loose or have not been properly torqued. Once configured, the wrench 100 displays the cycle number and the total number to be performed. For example, the display 230 of the wrench 100 may display a preset name 902 and number 904, target torque value 906, measurement units 908, batch count 910, and current cycle count 912 associated with the batch count operation.

The display 230 may also show a locked or unlocked icon to indicate whether the wrench 100 is in either one of a locked or unlocked selective states. As illustrated in FIG. 9, a locked icon 914 is displayed, indicating that the batch operation must be completed prior to moving to another operation. The device 160 may also configure the wrench 100 to redo a torqueing operation, if the torqueing operation was performed or measured incorrectly. In this instance, the cycle count to redo is displayed on the wrench 100.

Figure 10:
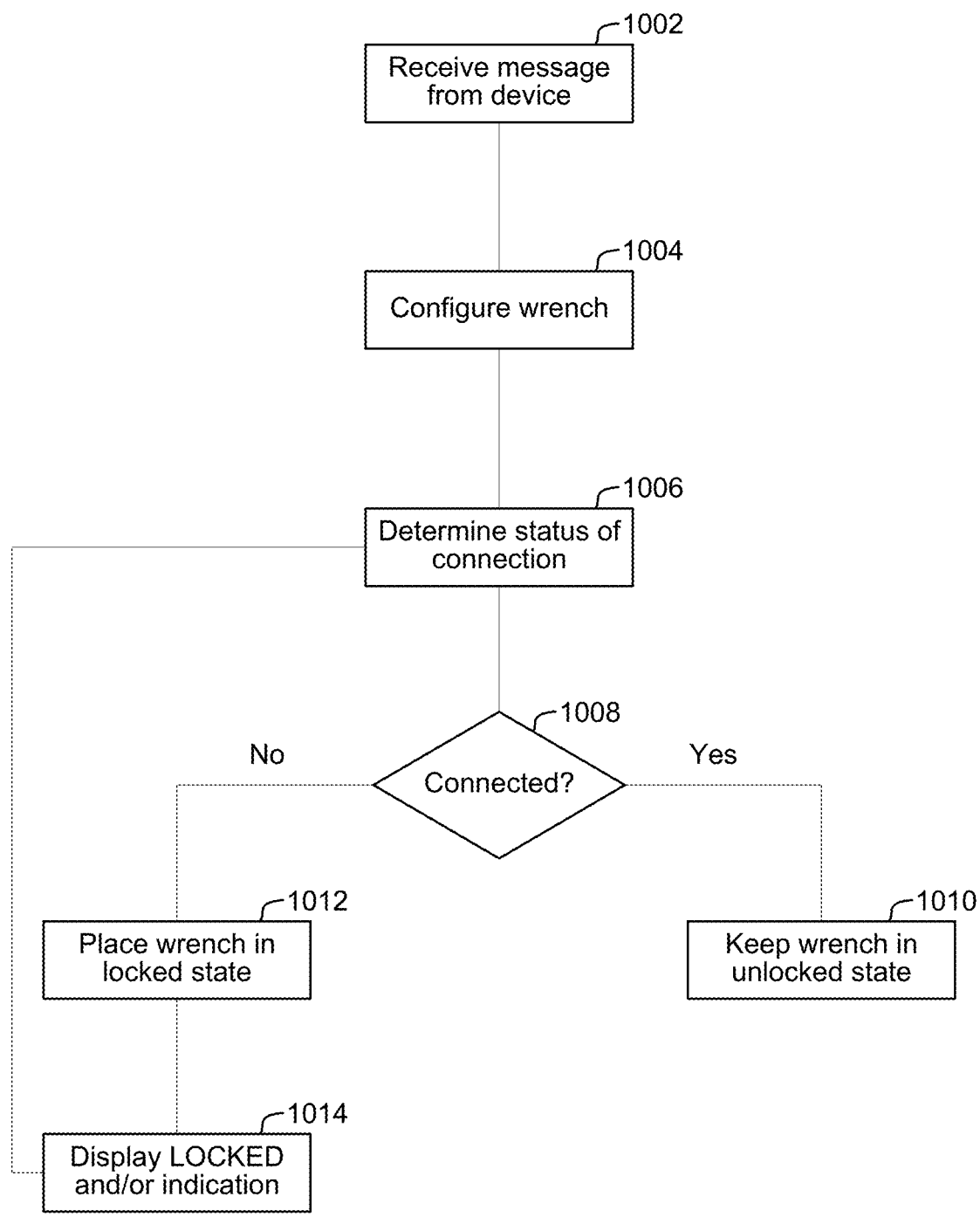
FIG. 10 is a process flow diagram illustrating example operations of a wrench lock operation based on a connection between a wrench and computing device, in accordance with an embodiment of the invention.

In another embodiment, the device 160 can be used to set up and configure locking operations of the wrench 100. Referring to FIG. 10, the wrench 100 can be configured to enter a locked state when a wireless link between the wrench 100 and device 160 is disabled or fails. For example, the wrench 100 receives a message from the device 160 and/or application running on the device 160 to configure a locking operation (1002). The wrench 100 configures itself, via the processor/controller 302, with the locking operation (1004). The wrench 100 and/or processor/controller 302 checks a status of a wireless communication link between the wrench 100 and the device 160 (1006). If the status of a wireless communication link (1008) is connected, the wrench 100 remains in the unlocked state (1010), and can be used to perform a torqueing operation. However, if the status of a wireless communication link (1008) is unconnected, the wrench 100 enters a locked state (1012), and measurement operations are disabled. A LOCKED message is displayed (1014), for example on the display 230, and an indication may be activated. For example, the indication may be a vibration that is activated (such as haptic vibrator 340), and illumination of red LEDs (such as LED 330a and/or 330b) until torque is released. When the link is re-connected, measurement may be reenabled re-enabled.

Figure 11:
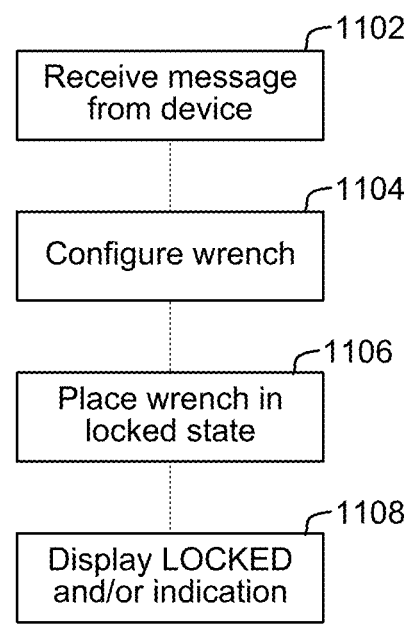
FIG. 11 a process flow diagram illustrating example operations of another wrench lock operation, in accordance with an embodiment of the invention.

Referring to FIG. 11, the wrench 100 can be configured to enter a locked state by the device 160. For example, a technician can use the device 160 and/or application running on the device 160 to place the wrench 100 in a locked state at any time. In this example, the wrench 100 receives a message from the device 160 and/or application running on the device 160 to configure a locking operation (1102). The wrench 100 configures itself, via the processor/controller 302, with the locking operation (1104). The wrench 100 enters a locked state (1106), and measurement operations are disabled. A LOCKED message, for example, is displayed (1108), on the display 230, and an indication may be activated. For example, the indication may be a vibration that is activated (such as haptic vibrator 340), and illumination of red LEDs (such as LED 330a and/or 330b) until torque is released. This may be useful when incorrect presets are being used or for any other reason. A power cycle or resending of preset parameters can be used to re-enable the wrench 100 for fastener operations.

Figure 12:
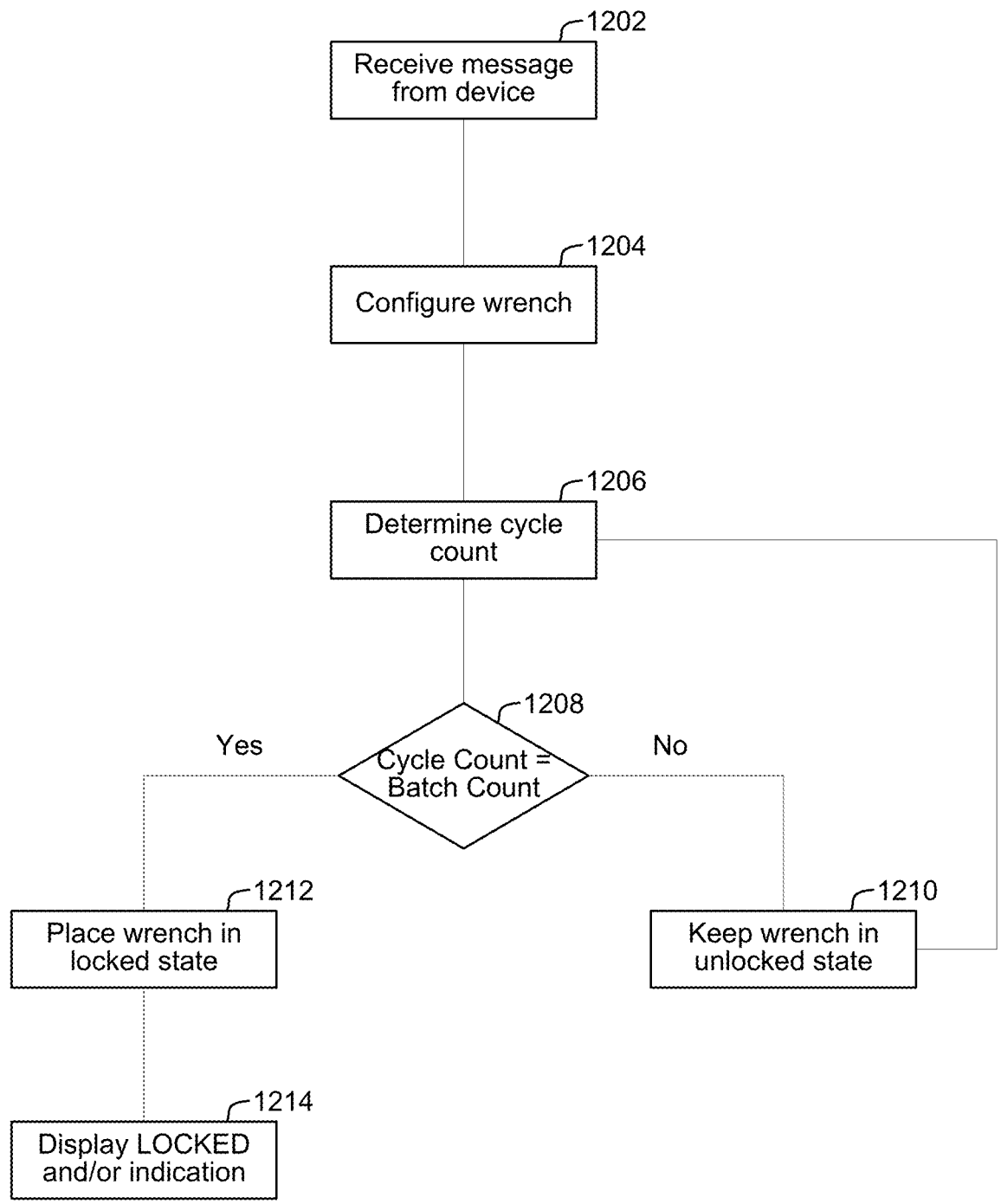
FIG. 12 a process flow diagram illustrating example operations of a wrench lock operation based on a batch operation, in accordance with an embodiment of the invention.

Referring to FIG. 12, the wrench 100 can be configured, by the device 160, to enter a locked state to prevent further fastener operations by enabling a lock at an end of batch operation. This can be used as a further indication to the user or technician that the batch operation has been completed. For example, a technician can use the device 160 and/or application running on the device 160 to send a lock operation or configuration to the wrench 100 In this example, the wrench 100 receives a message from the device 160 and/or application running on the device 160 to configure a locking operation (1202). The wrench 100 configures itself, via the processor/controller 302, with the locking operation (1204). The wrench 100 is used to perform the batch operation and determines whether a cycle count reaches the batch count (1206/1208). If the cycle count does not match the batch count, the wrench remains in the unlocked state (1210), and can be used to perform a torqueing operation. However, if the cycle count does match the batch count, the wrench 100 enters a locked state (1212), and further measurement operations are disabled. A LOCKED message is displayed (1214), for example on the display 230, and an indication may be activated. For example, the indication may be a vibration that is activated (such as haptic vibrator 340), and illumination of red LEDs (such as LED 330a and/or 330b). Resending preset parameters or a redo message can be used to re-enable the wrench 100 for fastener operations.

Figure 13:
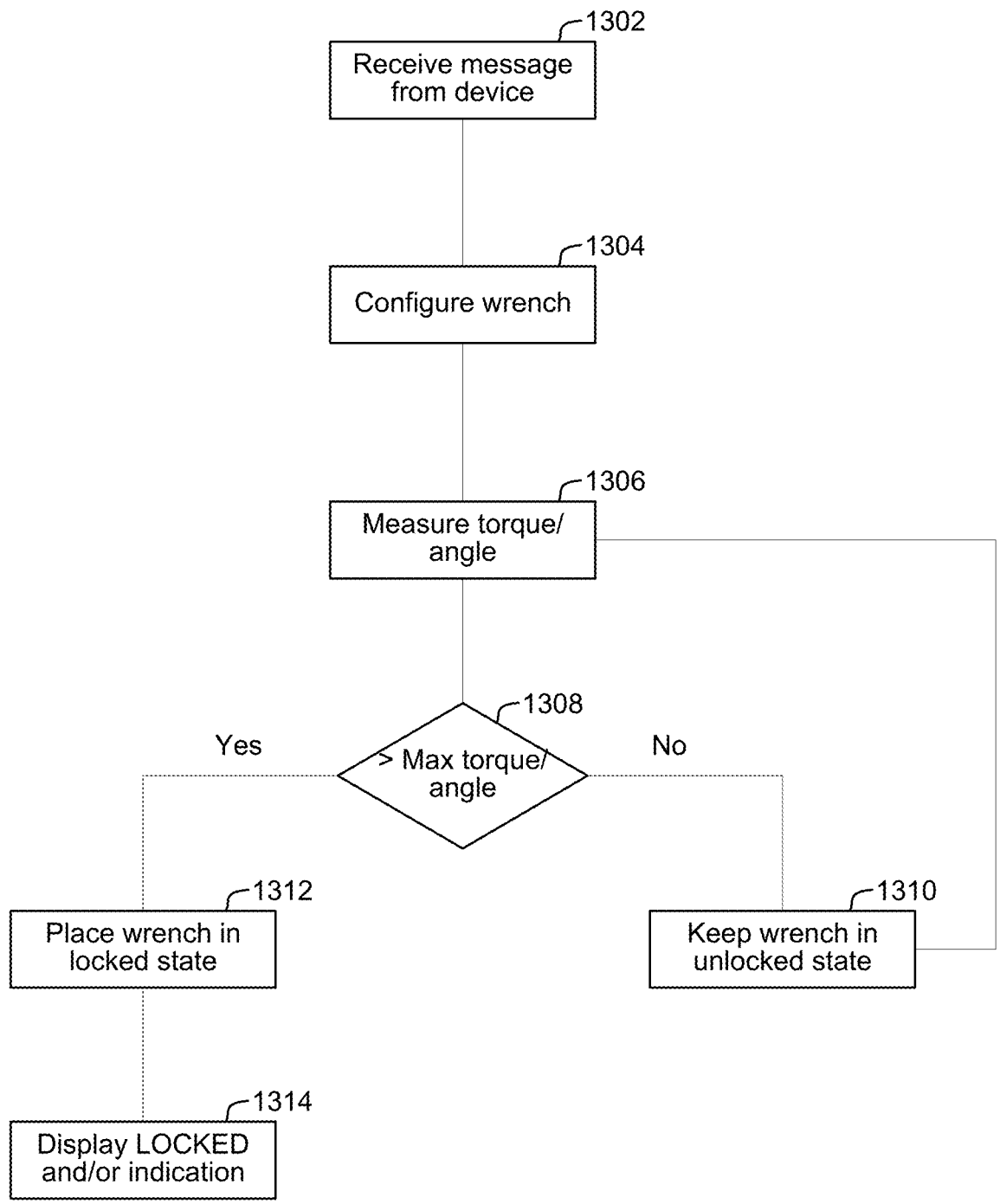
FIG. 13 a process flow diagram illustrating example operations of a wrench lock operation based on a torqueing operation, in accordance with an embodiment of the invention.

Referring to FIG. 13, the wrench 100 can be configured, by the device 160, to enter a locked state to prevent further fastener operations by enabling a lock on over torque or rotation. For example, a technician can use the device 160 and/or application running on the device 160 to send a lock operation or configuration to the wrench 100 In this example, the wrench 100 receives a message from the device 160 and/or application running on the device 160 to configure a locking operation (1302). The wrench 100 configures itself, via the processor/controller 302, with the locking operation (1304). The wrench 100 is used to perform a torqueing operation and measures applied torque and/or angle values (1306). The wrench 100 also determines whether the measured applied torque and/or angle values exceed maximum preset torque and/or angle values (1308). If the measured applied torque and/or angle values do not exceed the maximum preset torque and/or angle values, the wrench remains in the unlocked state (1310), and can be used to perform the torqueing operation. However, if the measured applied torque and/or angle values exceed the maximum preset torque and/or angle values, the wrench 100 enters a locked state (1312), and measurement operations are disabled. A LOCKED message is displayed (1314), for example on the display 230, and an indication may be activated. For example, the indication may be a vibration that is activated (such as haptic vibrator 340), and illumination of red LEDs (such as LED 330a and/or 330b). Resending preset parameters or a redo message can be used to re-enable the wrench 100 for fastener operations.

The device 160 and/or application running on the device 160 can also be used to lock the presets. For example, the wrench 100 can be locked to use only preset torque/angle measurements, and manual torque and angle modes are disabled. In this example, a lock icon (such as the lock icon 914) is displayed on the preset target screen of the display 230 when locked. The user/technician can only select from multiple presets on the wrench or application running on the device 160. A password may be required to make any configuration changes on the wrench 100.

The device 160 and/or application running on the device 160 can also be used to lock menu access to the wrench 100. For example, menu access on the wrench 100 can be locked, and manual torque and angle modes disabled. In this example, a lock icon (such as the lock icon 914) is displayed on the preset target screen of the display 230 when locked. A password may be required to enable access to menus on the wrench 100.

It should be appreciated that any number of the lock operations illustrated and described above may be used in combination with one another. The lock operations may also be used in conjunction with any of the other configurations, operations, presets, fastening tasks, etc. described herein.

The concepts disclosed herein may be applied within several different devices and computer systems. Although device 160 is described as a mobile device, any computer may be used. Likewise, the server(s) 190 may be any sort of computer.

The specific examples discussed above are meant to be illustrative. They were chosen to explain the principles and application of the disclosure and are not intended to be exhaustive. Persons having ordinary skill in the field of computers should recognize that components and process steps described herein may be interchangeable with other components or steps, or combinations of components or steps, and still achieve the benefits and advantages of the present invention.

The processes executed by the wrench 100, the device 160, and servers 190 may be implemented as a computer method or as an article of manufacture such as a memory device or non-transitory computer readable storage medium. The computer readable storage medium may be readable by a computer and may comprise instructions for causing a computer or other device to perform the described processes. The computer readable storage medium may be implemented by a non-volatile computer memory, storage, or media. In addition, some of the processing operations attributed to the wrench 100 may be implemented as firmware or as a state machine in hardware, such as implementing some or all of the operations executed by processor/controller 302 as an application specific integrated circuit (ASIC), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of configuring an electronic torque wrench with an external device, comprising:
   establishing a wireless communication connection between the electronic torque wrench and the external device;
   receiving a preset fastening task and a lock operation from the external device;
   determining a torque specification associated with the preset fastening task, wherein the torque specification includes a target torque value;
   configuring the electronic torque wrench with the torque specification and the lock operation; and
   determining that the wireless communication connection is disconnected to cause the electronic torque wrench to enter a locked state that disables measurement of torque by the electronic torque wrench, based on the lock operation.

2. The method of claim 1, wherein the torque specification further includes a batch count, and the method further includes:
   determining whether a cycle count matches the batch count; and
   if the cycle count is determined to match the batch count, then causing the electronic torque wrench to enter the locked state, based on the lock operation.

3. The method of claim 1, further comprising:
   determining a measured amount of torque applied to a fastener;
   determining whether the measured amount of torque exceeds the target torque value; and
   if the measured amount of torque is determined to exceed the target torque value, then causing the electronic torque wrench to enter the locked state, based on the lock operation.

4. The method of claim 1, further comprising displaying a lock screen on the electronic torque wrench in response to the electronic torque wrench entering the locked state.

5. The method of claim 1, further comprising activating a haptic vibrator of the electronic torque wrench in response to the electronic torque wrench entering the locked state.

6. The method of claim 1, further comprising illuminating a light emitting diode of the electronic torque wrench in response to the electronic torque wrench entering the locked state.

\* \* \* \* \*